US012223917B2

(12) United States Patent
Cheon et al.

(10) Patent No.: US 12,223,917 B2
(45) Date of Patent: Feb. 11, 2025

(54) DISPLAY DRIVING INTEGRATED CIRCUIT CONFIGURED TO PERFORM ADAPTIVE FRAME OPERATION AND OPERATION METHOD THEREOF

(71) Applicant: Samsung Electronics Co., Ltd., Suwon-si (KR)

(72) Inventors: Seongmin Cheon, Hwaseong-si (KR); Jihyun Ahn, Suwon-si (KR); Donghwy Kim, Hwaseong-si (KR); Jong-Kon Bae, Seoul (KR); Yunpyo Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/380,419

(22) Filed: Oct. 16, 2023

(65) Prior Publication Data

US 2024/0046885 A1 Feb. 8, 2024

Related U.S. Application Data

(63) Continuation of application No. 17/398,947, filed on Aug. 10, 2021, now Pat. No. 11,810,519.

(30) Foreign Application Priority Data

Aug. 13, 2020 (KR) ........................ 10-2020-0101954

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0243* (2013.01); *G09G 2310/08* (2013.01); *G09G 2320/02* (2013.01); *G09G 2320/10* (2013.01); *G09G 2360/18* (2013.01); *G09G 2370/00* (2013.01)

(58) Field of Classification Search
CPC .................................................. G09G 2320/10
See application file for complete search history.

(56) References Cited

U.S. PATENT DOCUMENTS 5,777,667 A 7/1998 Miyake et al.
6,697,116 B1 2/2004 Kurokawa et al.
9,542,883 B2 1/2017 Lee et al.
9,626,909 B2 4/2017 Ceballos
(Continued)

FOREIGN PATENT DOCUMENTS

JP 2006210848 A 8/2006

*Primary Examiner* — William Boddie
*Assistant Examiner* — Bipin Gyawali
(74) *Attorney, Agent, or Firm* — Muir Patent Law, PLLC

(57) ABSTRACT

A display driving integrated circuit performs an adaptive frame operation. An operation method of the display driving integrated circuit includes outputting current frame data to an external display panel, starting to receive next frame data from an external device after a first time point, the first time point being a time point when a first time period elapses, the first time period immediately following a second time point at which the current frame data are completely output, and generating a vertical synchronization signal at a third time point synchronized with a cycle of an emission control signal, in response to starting to receive the next frame data.

14 Claims, 20 Drawing Sheets

(56) References Cited

U.S. PATENT DOCUMENTS

| | | | |
|---|---|---|---|
| 9,786,255 | B2 | 10/2017 | Verbeure et al. |
| 10,089,927 | B2 | 10/2018 | Sarma et al. |
| 10,395,596 | B2 | 8/2019 | Jang et al. |
| 11,854,491 | B2 * | 12/2023 | Hatayama ............ G09G 3/3275 |
| 2002/0109786 | A1 | 8/2002 | Chae |
| 2004/0033071 | A1 | 2/2004 | Naoki |
| 2007/0126683 | A1 | 6/2007 | Sung et al. |
| 2013/0057763 | A1 | 3/2013 | Cha et al. |
| 2015/0049103 | A1 | 2/2015 | Kumeta |
| 2016/0063939 | A1 | 3/2016 | Lee et al. |
| 2016/0329019 | A1 | 11/2016 | An |
| 2017/0069256 | A1 | 3/2017 | Seo et al. |
| 2018/0342202 | A1 | 11/2018 | Sung et al. |
| 2019/0340973 | A1 * | 11/2019 | Kim ..................... G09G 3/3233 |
| 2020/0082760 | A1 * | 3/2020 | Ogata .................. G09G 3/3258 |
| 2021/0280148 | A1 | 9/2021 | Liu et al. |
| 2023/0306913 | A1 * | 9/2023 | Hatayama ................ G09G 3/20 |

* cited by examiner

DISPLAY DRIVING INTEGRATED CIRCUIT CONFIGURED TO PERFORM ADAPTIVE FRAME OPERATION AND OPERATION METHOD THEREOF

CROSS-REFERENCE TO RELATED APPLICATIONS

This application is a continuation application of U.S. patent application Ser. No. 17/398,947, filed Aug. 10, 2021, which claims priority under 35 U.S.C. § 119 to Korean Patent Application No. 10-2020-0101954 filed on Aug. 13, 2020, in the Korean Intellectual Property Office, the disclosure of each of which is incorporated by reference herein in its entirety.

BACKGROUND

Embodiments of the present disclosure described herein relate to an electronic device, and more particularly, relate to a display driving integrated circuit configured to perform an adaptive frame operation and an operation method thereof.

An electronic device may provide a variety of image information to a user. The image information may be processed by a graphic processing unit included in the electronic device and may output through a display device depending on a given scan rate. An output timing of image data may change due to various factors (e.g., rendering delay) occurring at the graphic processing unit, thereby causing a decrease of the quality of image output through the display device. A display driving integrated circuit may provide an adaptive frame rate or an adaptive frame sync for the purpose of preventing the decrease of the image quality.

SUMMARY

Embodiments of the present disclosure provide a display driving integrated circuit configured to perform an adaptive frame operation capable of providing an image of an improved quality and an operation method thereof.

According to an embodiment, an operation method of a display driving integrated circuit which performs an adaptive frame operation includes outputting current frame data to an external display panel, starting to receive next frame data from an external device after a first time point, the first time point being a time point when a first time period elapses, the first time period immediately following a second time point at which the current frame data are completely output, and generating a vertical synchronization signal at a third time point synchronized with a cycle of an emission control signal, in response to starting to receive the next frame data.

According to an embodiment, a display driving integrated circuit includes an interface circuit that sequentially receives first frame data and second frame data from an external device, a timing controller that generates a vertical synchronization signal in response to receiving the first and second frame data, a source driver that outputs the first frame data, and the second frame data to an external display panel in response to the vertical synchronization signal, and an emission control driver that outputs an emission control signal corresponding to target luminance. The first frame data are output to the external display panel during a first frame period defined by the vertical synchronization signal, and the second frame data are output to the external display panel during a second frame period defined by the vertical synchronization signal. A length of the first frame period is different from a length of the second frame period, and the timing controller generates the vertical synchronization signal in synchronization with a cycle of the emission control signal.

According to an embodiment, an operation method of a display driving integrated circuit configured to perform an adaptive frame operation includes outputting current frame data to an external display panel, receiving next frame data from an external device at a third time, the third time being a time after a second time when a vertical front porch (VFP) passes, the VFP beginning at a first time when the current frame data are completely output, generating a vertical synchronization signal at a fourth time after the third time, and outputting the next frame data to the external display panel in response to the vertical synchronization signal, after a vertical back porch (VBP) from the fourth time. During a first time period from the second time to the third time, an emission control signal provided to the external display panel is maintained at a first level. During a second time period from the third time to the fourth time, the emission control signal is maintained at a second level.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the present disclosure.

Figure 1:
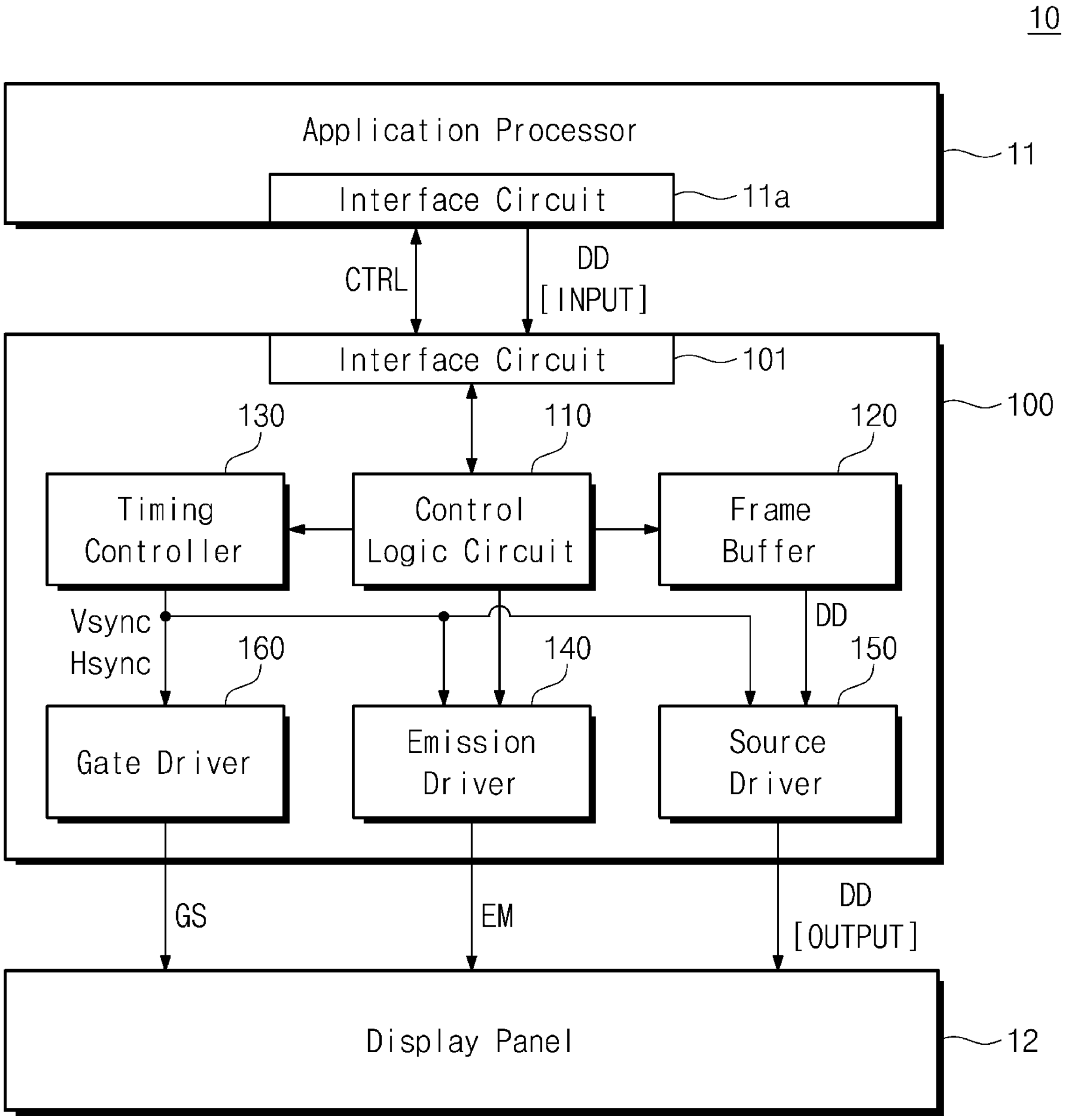
FIG. 1 is a block diagram illustrating an electronic device according to an embodiment of the present disclosure.

FIG. 1 is a block diagram illustrating an electronic device according to an embodiment of the present disclosure. Referring to FIG. 1, an electronic device 10 may include an application processor 11, a display panel 12, and a display driving integrated circuit (DDI) 100. The electronic device 10 may be a display device, which is configured to provide image information to a user, such as a portable communication terminal, a personal digital assistant (PDA), a portable media player (PMP), a digital camera, a smartphone, a tablet computer, a laptop computer, a wearable device, a monitor, or a television (TV), or may be a device including the display device.

The application processor 11 may control overall operations of the electronic device 10. The application processor 11 may be configured to generate or process image data to be displayed through the display panel 12. In an embodiment, the application processor 11 may include a graphic processing unit configured to generate or process image data.

The DDI 100 may control the display panel 12 under control of the application processor 11. For example, the DDI 100 may include a control logic circuit 110, a frame buffer 120, a timing controller 130, an emission driver 140, a source driver 150, and a gate driver 160.

The control logic circuit 110 may control overall operations of the DDI 100. The frame buffer 120 may be configured to store frame data DD received from the application processor 11.

The timing controller 130 may generate various timing signals under control of the control logic circuit 110. For example, the timing controller 130 may be configured to generate a vertical synchronization signal Vsync defining one frame period. The timing controller 130 may be configured to generate a horizontal synchronization signal Hsync that is used to indicate a row of pixels of the display panel 12, which is targeted for display.

The emission driver 140 may be configured to generate an emission control signal EM under control of the control logic circuit 110. For example, the display panel 12 may include a plurality of pixels. Each of the plurality of pixels may include an organic light emitting diode (OLED). Each of the plurality of pixels may emit a light with a brightness corresponding to the emission control signal EM. That is, the emission driver 140 may generate the emission control signal EM such that the plurality of pixels of the display panel 12 emit lights with intended luminance (hereinafter referred to as "target luminance"). In an embodiment, the emission control signal EM may be a pulse signal that is based on a pulse width modulation (PWM) manner. The emission control signal EM will be more fully described with reference to FIG. 2.

The source driver 150 may transmit the frame data DD stored in the frame buffer 120 to the display panel 12 in synchronization with the timing signal (e.g., the vertical synchronization signal Vsync or the horizontal synchronization signal Hsync) generated from the timing controller 130.

The gate driver 160 may be configured to generate a gate signal GS in synchronization with the timing signal (e.g., the vertical synchronization signal Vsync or the horizontal synchronization signal Hsync) generated from the timing controller 130.

The display panel 12 may be configured to display an image associated with the frame data DD in response to the frame data DD, the emission control signal EM, and the gate signal GS output from the DDI 100. As described above, the display panel 12 may include the plurality of pixels, and each of the plurality of pixels may be implemented with an organic light emitting diode (OLED) pixel. That is, the display panel 12 may be an organic light emitting diode panel, but the present disclosure is not limited thereto. For example, the display panel 12 may be implemented with one of various types of display panels such as a liquid crystal display panel, an organic light emitting display panel, an electrophoretic display panel, an electrowetting display panel, and a micro light emitting diode (LED) panel.

In an embodiment, the application processor 11 may further include an interface circuit 11*a*, and the DDI 100 may further include an interface circuit 101. The application processor 11 may transmit the frame data DD to the DDI 100 through the interface circuits 11*a* and 101 and may exchange various control signals CTRL with the DDI 100 through the interface circuits 11*a* and 101.

In an embodiment, the interface circuits 11*a* and 101 may be communication circuits that are based on a mobile industry processor interface display serial interface (MIPI DSI) and may include physical layers of an MIPI D-PHY, respectively. However, the present disclosure is not limited thereto. For example, the interface circuits 11*a* and 101 may be configured to support various (or different) interface protocols or to include various (or different) physical layers.

In an embodiment, the MIPI DSI may be configured to support a video mode or a command mode. The video mode may indicate an operation mode in which the application processor 11 transmits the frame data DD to the DDI 100 in the form of a real-time pixel stream. The command mode may indicate an operation mode in which the application processor 11 transmits the frame data DD to the DDI 100 in the form of including a command and pixel data.

In the command mode, the DDI 100 may store the received frame data DD in the frame buffer 120. In an embodiment, in the command mode, the DDI 100 may transmit a tearing effect (TE) signal (hereinafter referred to as a "TE signal"), which indicates a state of the frame buffer 120, to the application processor 11 for the purpose of preventing the tearing effect. The TE signal may be one of the various control signals CTRL.

In the command mode, the application processor 11 may transmit the frame data DD to the DDI 100 in response to the TE signal. Below, to describe the technical idea of the present disclosure easily, it is assumed that the DDI 100 operates based on the command mode. However, the present disclosure is not limited thereto. For example, it may be understood that the DDI 100 to be described below may operate in the video mode supported by the MIPI DSI or an operation of the DDI 100 to be described below may be performed in the video mode.

In an embodiment, the DDI 100 may be configured to provide a variable frame function or an adaptive frame rate or an adaptive frame synchronization, or to perform a variable frame operation or an adaptive frame operation or an adaptive frame sync operation. For example, an application processor may transmit frame data to a DDI at an interval corresponding to a given frame rate (e.g., 60 Hz or 120 Hz). However, the output or transmission of the frame data may be delayed due to various factors (e.g., a rendering delay due to a load of any other operation) occurring at the application processor. The delay of the frame data may cause a decrease of the quality of an image to be displayed through a display panel.

The DDI 100 according to an embodiment of the present disclosure may prevent the reduction of the quality of image by varying a frame rate of an image to be displayed through the display panel 12 (or may vary a frame period of the image). For example, the DDI 100 may provide a variable frame function of varying a frame rate of an image to be displayed through the display panel 12 depending on a timing when the application processor 11 outputs the frame data DD.

In an embodiment, a duty ratio of the emission control signal EM may change in a variable frame period where a frame rate is changed. For example, though the same emission control signal EM may be input, because the frame rate is longer or shorter, the duty ratio of that emission control signal EM for different periods of the variable frame rate may vary. In this case, in the variable frame period, the luminance of the image to be displayed through the display panel 12 may be changed. For example, as described above, the luminance to be expressed through the display panel 12 may be determined depending on a duty ratio of the emission control signal EM. For example, in one frame period, in the case where a duty ratio of the emission control signal EM is changed, the luminance to be expressed through the display panel 12 may be changed. This may mean that the quality of image decreases.

As is traditional in the field of the disclosed technology, features and embodiments are described, and illustrated in the drawings, in terms of functional blocks, units and/or modules (e.g., application processor 11, timing controller 130, control logic circuit 110, frame buffer 120, gate driver 160, emission driver 140, and source driver 150). Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

The DDI 100 according to an embodiment of the present disclosure may control a timing of the vertical synchronization signal Vsync or a level and a cycle or a frequency of the emission control signal EM, based on a timing of input frame data DD, in the variable frame period. In this case, because the duty ratio of the emission control signal EM is uniformly maintained in the variable frame period, the luminance of an image to be displayed through the display panel 12 may be uniformly maintained. Below, an operation of the DDI 100 according to an embodiment of the present disclosure will be more fully described with reference to the following drawings.

Figure 2:
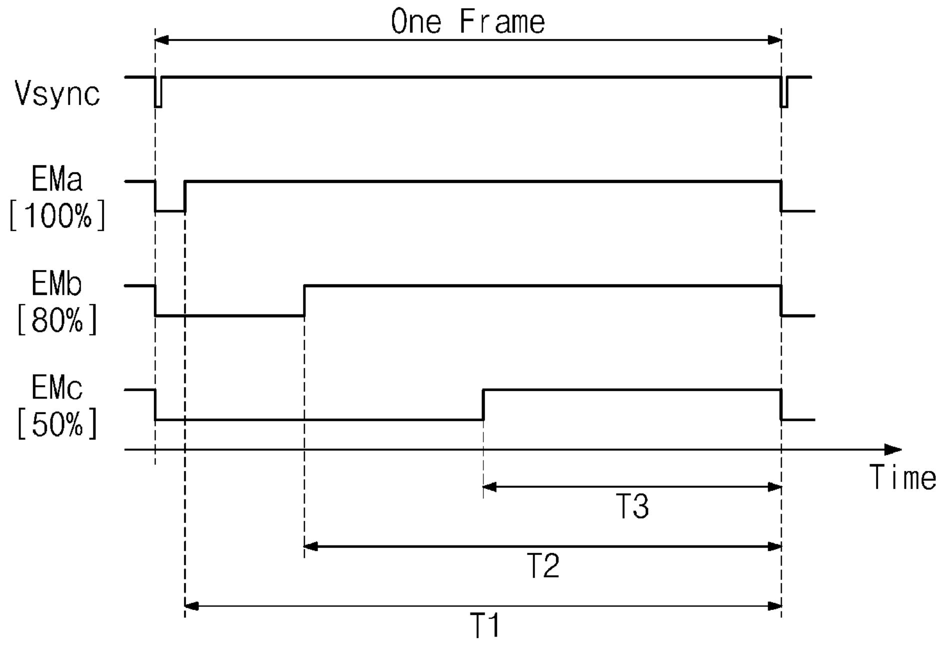
FIG. 2 is a timing diagram for describing an emission control signal generated by an emission driver of FIG. 1, according to one example embodiment.

FIG. 2 is a timing diagram for describing an emission control signal generated by an emission driver of FIG. 1. For convenience of description, it is assumed that a cycle of the emission control signal EM is identical to one frame period. Referring to FIGS. 1 and 2, one frame period may be defined by the vertical synchronization signal Vsync. For example, one frame period may be defined as a period from an activation timing or a generation timing of the vertical synchronization signal Vsync (e.g., a high-to-low transition timing of the vertical synchronization signal Vsync) to a next activation timing or a next generation timing.

The emission control signal EM may be a pulse signal having "n" cycles within one frame, where "n" is a positive integer. For example, emission control signals EMa, EMb, and EMc illustrated in FIG. 2 may be pulse signals having one cycle within one frame period.

A duty ratio of the emission control signal EM (i.e., an ON/OFF ratio within one cycle) may be determined based on target luminance of an image to be displayed through the display panel 12. For convenience of description, it is assumed that a high level of the emission control signal EM corresponds to an ON state and a low level thereof corresponds to an OFF state. For example, in the case where the emission control signal EM is at the high level, a plurality of pixels of the display panel 12 may emit a light; in the case where the emission control signal EM is at the low level, a plurality of pixels of the display panel 12 may not emit a light. However, the present disclosure is not limited thereto. For example, the ON state and the OFF state of the emission control signal EM may be interchanged depending on a type of a plurality of pixels (e.g., a type of an emission control switch or an emission control transistor included in each of the plurality of pixels).

In the case where the luminance of 100% is expressed through the display panel 12, an emission control signal may be generated like the first emission control signal EMa of FIG. 2. In this case, an ON period of the first emission control signal EMa may correspond to a first time T1.

In the case where the luminance of 80% is expressed through the display panel 12, an emission control signal may be generated like the second emission control signal EMb of FIG. 2. In this case, an ON period of the second emission control signal EMb may correspond to a second time T2 shorter than the first time T1.

In the case where the luminance of 50% is expressed through the display panel 12, an emission control signal may be generated like the third emission control signal EMc of FIG. 2. In this case, an ON period of the third emission control signal EMc may correspond to a third time T3 shorter than the second time T2. The times T1 through T3 are relative to each other and may each correspond to a particular percentage of the total time of the frame period. For example, T1 may be between 90%-95% of the frame period, T2 may be between 70%-80% of the frame period, and T3 may be between 45%-55% of the frame period.

The target luminance may be expressed through the display panel 12 by increasing the ON period of the emission control signal EM (or increasing an ON duty ratio) as the target luminance to be expressed through the display panel 12 increases.

The above way to drive the emission control signal EM is called a "pulse width modulation (PWM) manner". Below, for convenience of description, it is assumed that the emission control signal EM is a PWM pulse signal generated based on the above PWM manner.

FIGS. 3A to 3D are timing diagrams for describing a variable frame function of a DDI. In the timing diagrams of FIGS. 3A to 3D, the horizontal axis represents a time. In the timing diagrams of FIGS. 3A to 3D, "INPUT" indicates the frame data DD received from the application processor 11, "Vsync" indicates a vertical synchronization signal generated by the timing controller 130, "OUTPUT" indicates frame data DD output from the DDI 100 to the display panel 12, "DATA_en" indicates a data enable signal indicating activation of the frame data DD output from the DDI 100 to the display panel 12, "TE" indicates a tearing effect signal transmitted from the DDI 100 to the application processor 11, and "EM" indicates an emission control signal provided from the DDI 100 to the display panel 12. Various signals may be input to the DDI 100 or may be output from the DDI 100, but signal components unnecessary to describe the present disclosure will be omitted from drawings.

Below, the term "generating a specific signal" is used for convenience of description. For example, the vertical synchronization signal Vsync that is maintaining the high level may change from the high level to the low level at a specific timing. In this case, the expression that the vertical synchronization signal Vsync is generated at a specific timing is given in the specification. For example, to generate a specific signal may mean to change a state of the specific signal to an activation state or to change a level of the specific signal to the high level to the low level or from the low level to the high level.

A manner in which a DDI operates when an application processor transmits frame data at a regular timing (i.e., at a given scan rate) will be described with reference to FIG. 3A, a manner in which the DDI operates when not supporting the variable frame function will be described with reference to FIG. 3B, and a manner in which the DDI operates when supporting the variable frame function will be described with reference to FIGS. 3C and 3D.

Figure 3A:
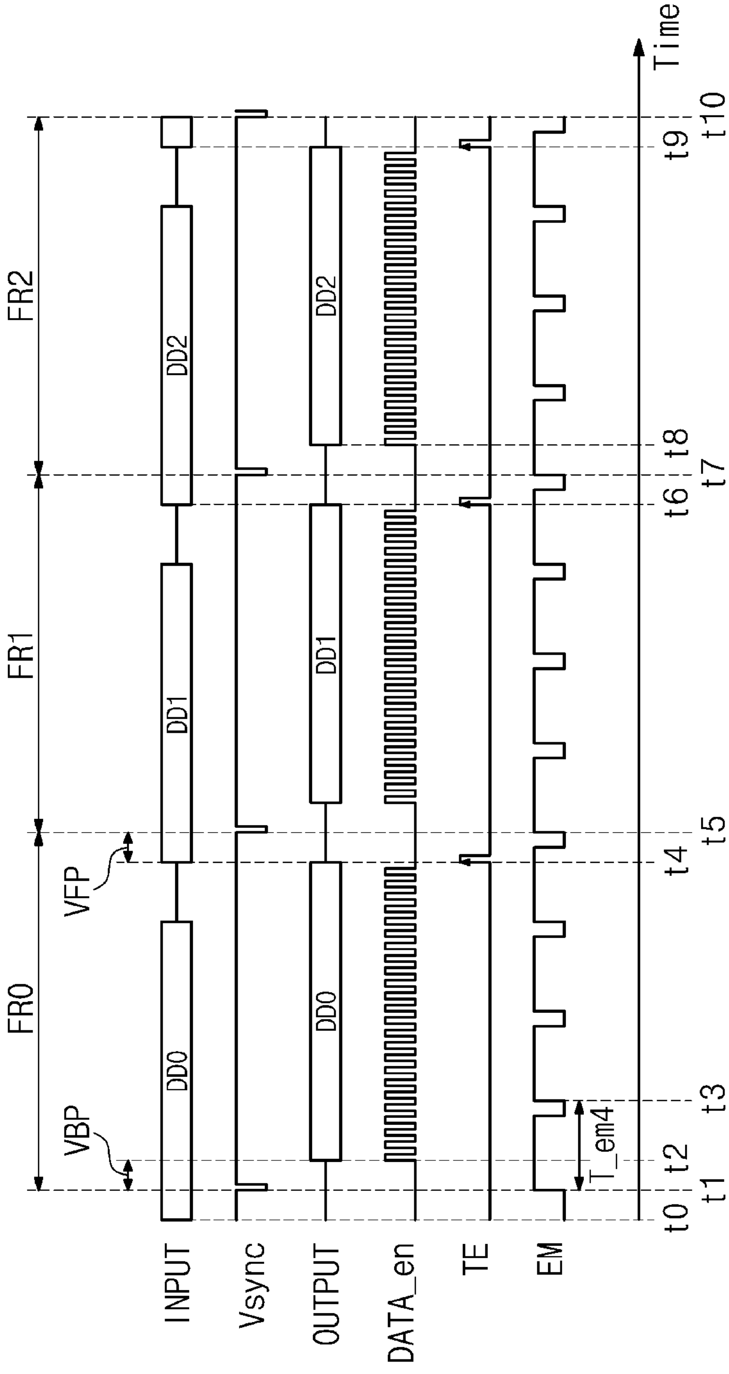
FIGS. 3A to 3D are timing diagrams for describing a variable frame function of a DDI.

First, referring to FIGS. 1 and 3A, at a 0-th time t0, the DDI 100 may receive 0-th frame data DD0 from the application processor 11. The 0-th frame data DD0 thus received may be stored in the frame buffer 120.

At a first time t1, the DDI 100 may generate the vertical synchronization signal Vsync. For example, when the DDI 100 operates in the command mode, the control logic circuit 110 of the DDI 100 may recognize a time (i.e., the 0-th time t0) at which the 0-th frame data DD0 starts to be received, based on a command received from the application processor 11. The control logic circuit 110 may control the timing controller 130 in response to the 0-th frame data DD0 being received. The timing controller 130 may generate the vertical synchronization signal Vsync at the first time t1 under control of the control logic circuit 110.

After a vertical back porch VBP passes from the first time t1 when the vertical synchronization signal Vsync is generated, for example, during a period from a second time t2 to a fourth time t4, a data enable signal DATA_en may be activated. While the data enable signal DATA_en is activated, the 0-th frame data DD0 stored in the frame buffer 120 may be output to the display panel 12. For example, the source driver 150 may transmit the 0-th frame data DD0 to the display panel 12 in synchronization with the data enable signal DATA_en.

At the fourth time t4 when the 0-th frame data DD0 are completely transmitted, the TE signal may be generated. The TE signal may be a signal notifying the application processor 11 that specific frame data stored in the frame buffer 120 are completely transmitted (i.e., to the display panel 12). In an embodiment, the TE signal may be transmitted from the DDI 100 to the application processor 11 through the interface circuits 101 and 11*a*.

In response to the TE signal thus generated, the application processor 11 may transmit first frame data DD1 being next frame data to the DDI 100 at the fourth time t4. The first frame data DD1 may be stored in the frame buffer 120.

At a fifth time t5 when a vertical front porch VFP passes from the fourth time t4 when the 0-th frame data DD0 are completely transmitted, the vertical synchronization signal Vsync may be generated.

During a period from a time, at which the vertical back porch VBP passes from the fifth time t5, to a sixth time t6, the DDI 100 may output the first frame data DD1 to the display panel 12. At the sixth time t6, the TE signal may be generated. In response to the TE signal thus generated, the application processor 11 may transmit second frame data DD2 to the DDI 100. The vertical synchronization signal Vsync may be generated at a seventh time t7 when the vertical front porch VFP passes from the sixth time t6, and the second frame data DD2 may be output from an eighth time t8, at which the vertical back porch VBP passes from the seventh time t6, to a ninth time t9. The vertical synchronization signal Vsync may be generated at a tenth time t10 when the vertical back porch VBP passes from the ninth time t9.

0-th to second frame periods FR0 to FR2 may be defined by time points at which the vertical synchronization signal Vsync is generated. For example, the 0-th frame period FR0 may be defined as a period from the first time t1 to the fifth time t5, the first frame period FR1 may be defined as a period from the fifth time t5 to the seventh time t7, and the second frame period FR2 may be defined as a period from the seventh time t7 to the tenth time t10. Each of the 0-th to second frame periods FR0 to FR2 may include the vertical back porch VBP, a transfer period of the corresponding frame data, and a vertical front porch VFP. That is, in the case where an application processor transmits frame data at a uniform timing (or a uniform scan rate), the 0-th to second frame periods FR0 to FR2 may be identical.

In each of the 0-th to second frame periods FR0 to FR2, the emission control signal EM may be generated to have "N" cycles, where N is a positive interval. For example, as illustrated in FIG. 3A, a cycle of the emission control signal EM may be T_em4. The cycle of T_em4 may correspond to a time from the first time t1 to the third time t3. In this case, the cycle of T_em4 may be repeated four times during one frame period (e.g., the 0-th period FR0). For example, the emission control signal EM may be a PWM signal that is repeated four times in one frame period.

During the cycle of T_em4, the emission control signal EM may have a uniform duty ratio (i.e., a ratio of an ON period and an OFF period). The duty ratio of the emission control signal EM may correspond to a value of target luminance to be expressed through the display panel 12. As such, in the 0-th to second frame periods FR0 to FR2, the duty ratio of the emission control signal EM may be uniformly maintained. This may mean that the luminance of an image to be displayed through the display panel 12 is uniformly maintained.

Figure 3B:
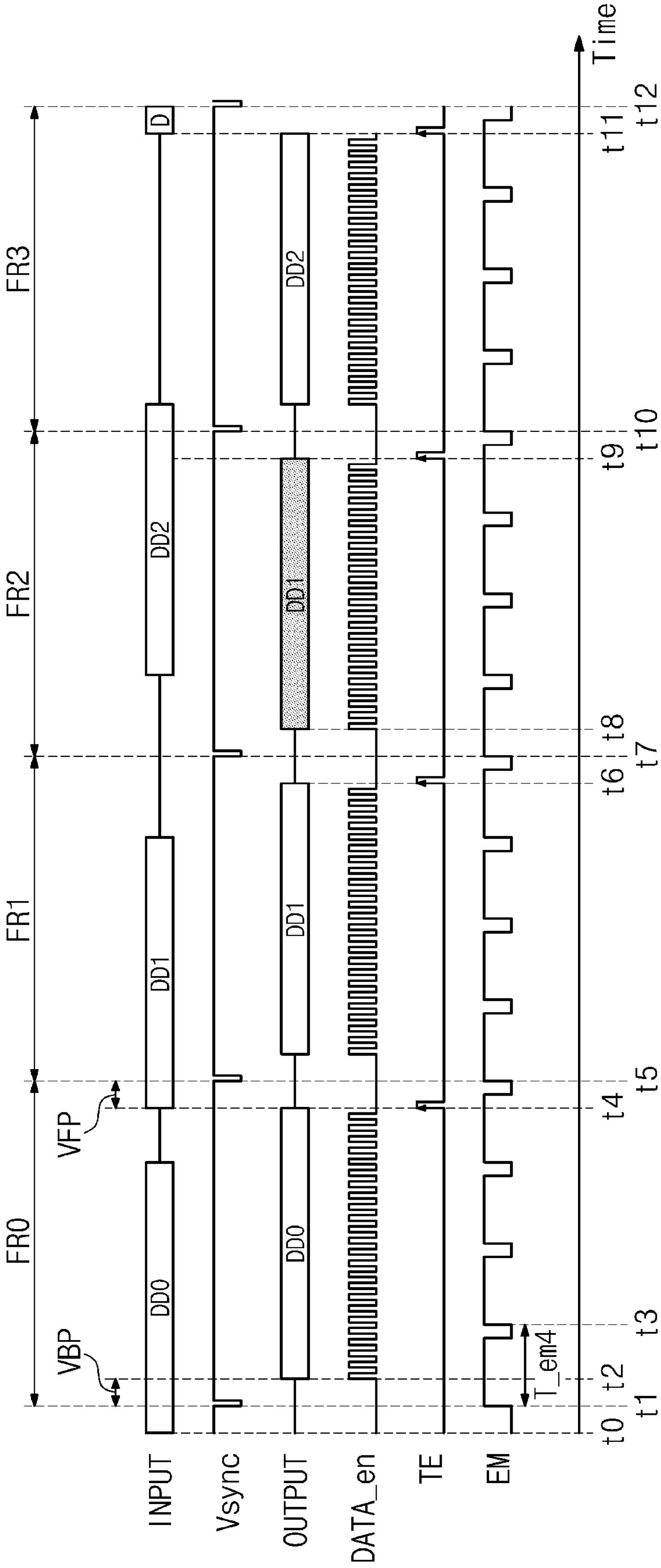

Next, referring to FIG. 3B, a DDI may not support the variable frame function or the adaptive frame operation. In this case, the DDI may operate as illustrated in FIG. 3B. For example, in the case where the DDI does not support the variable frame function, the vertical synchronization signal Vsync may be generated at times fixed according to a given frame rate. Due to various factors occurring at an application, a timing when the second frame data DD2 are input to the DDI may be delayed with respect to the seventh time t7 (i.e., a time when the vertical synchronization signal Vsync is generated). In this case, at the eighth time t8, because the second frame data DD2 are not input to a frame buffer, the DDI may output the previous first frame data DD1 during the second frame period FR2. Afterwards, the second frame data DD2 may be output during a period from the tenth time t10 to an eleventh time t11. Afterwards, at a twelfth time t12, the vertical synchronization signal Vsync may be generated. The remaining reference signs and times are described with reference to FIG. 3A, and thus, additional description will be omitted to avoid redundancy.

As illustrated in FIG. 3B, in the case where an input of the second frame data DD2 is delayed, the same frame data, that is, the first frame data DD1 are output in the first and second frame periods FR1 and FR2. In this case, because the same image is displayed over two or more frame periods, a phenomenon such as a gap between images or an image delay may occur.

Figure 3C:
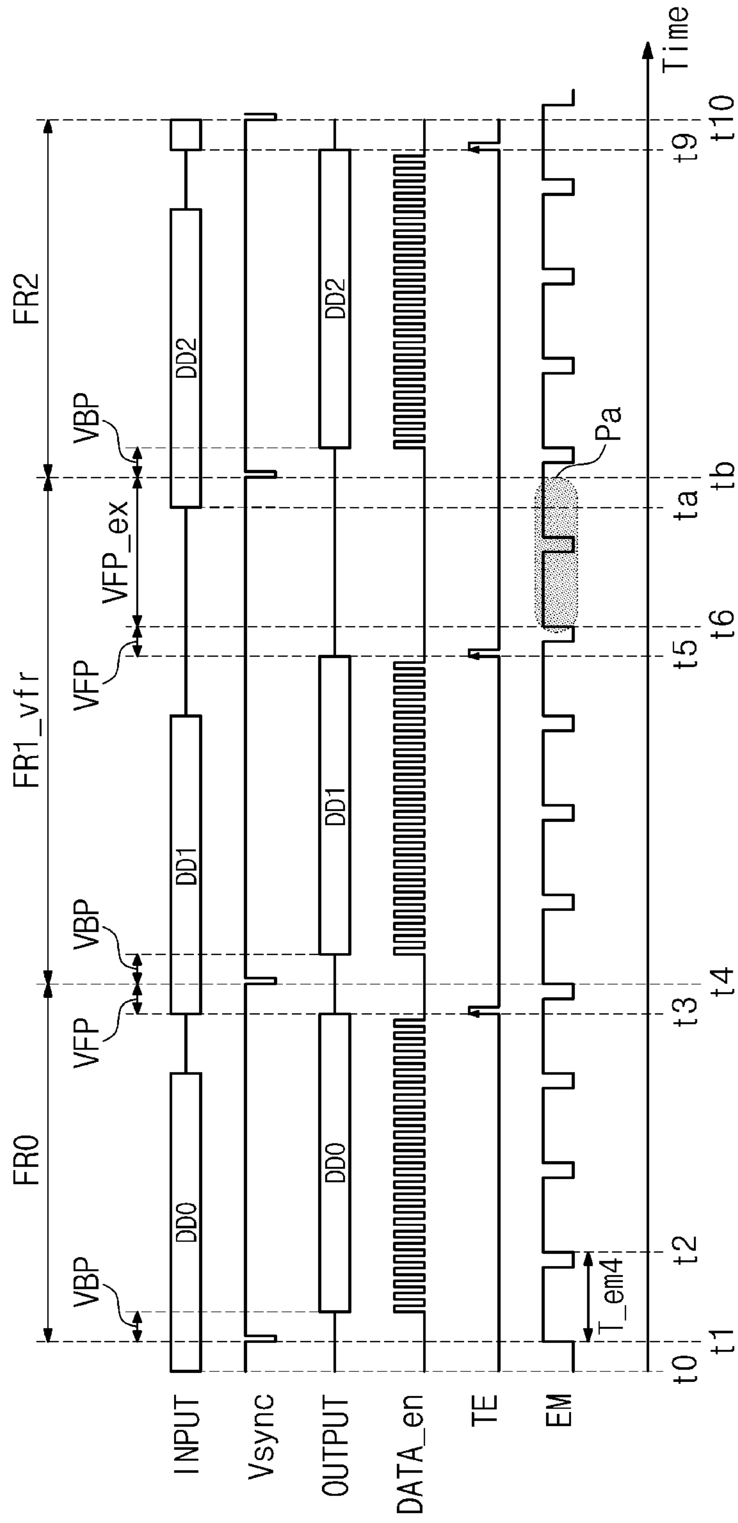

Then, referring to FIG. 3C, a DDI may provide the variable frame function. In this case, the DDI may operate like the timing diagram illustrated in FIG. 3C. The DDI may vary a length of a specific frame period based on an input timing of frame data.

For example, as described with reference to FIG. 3A, in the case where there is no delay of a frame data input, the second frame data DD2 may start to be input (or received) from the fifth time t5. However, due to various factors occurring at an application processor, the second frame data DD2 may start to be received at an a-th time ta. The DDI may generate the vertical synchronization signal Vsync at a b-th time tb in response to that the second frame data DD2 start to be received.

For example, in the case where the variable frame function is supported, a time when the vertical synchronization signal Vsync is generated may be variable. For example, in the case where the variable frame function is not supported, the vertical synchronization signal Vsync may be generated at the sixth time t6 when the vertical front porch VFP passes from the fifth time t5.

In contrast, in the case where the variable frame function is supported, as illustrated in FIG. 3C, a time when the vertical synchronization signal Vsync is generated may be delayed from the sixth time t6 to the b-th time tb. In this case, a period from the sixth time t6 to the b-th time tb may be defined as an expanded vertical front porch VFP_ex. The DDI may delay the generation of the vertical synchronization signal Vsync as much as the expanded vertical front porch VFP_ex depending on a timing when frame data are input (or received). In this case, the first frame period FR1 may be changed to a first variable frame period FR1_vfr, and thus, a normal image may be provided through a display panel.

In contrast, as described above, in the case where luminance to be expressed through the display panel is uniform (i.e., in the case where the target luminance is uniform), the emission control signal EM may maintain a uniform cycle and a uniform duty ratio without a separate control. In this case, as illustrated in FIG. 3C, the emission control signal EM may be output as a PWM pulse signal having a cycle of T_em4 and a uniform duty ratio. In this case, the duty ratio of the emission control signal EM may change in a portion (e.g., the expanded vertical front porch VFP_ex) of the first variable frame period FR1_vfr. As described above, one way to express uniform luminance through the display panel is to uniformly maintain the duty ratio of the emission control signal EM in each frame period. However, as illustrated in an a-th period Pa of FIG. 3C, as the generation of the vertical synchronization signal Vsync is delayed as much as the expanded vertical front porch VFP_ex, the duty ratio of the emission control signal EM may change in the first variable frame period FR1_vfr. In this case, luminance to be expressed through the display panel may change.

Figure 3D:
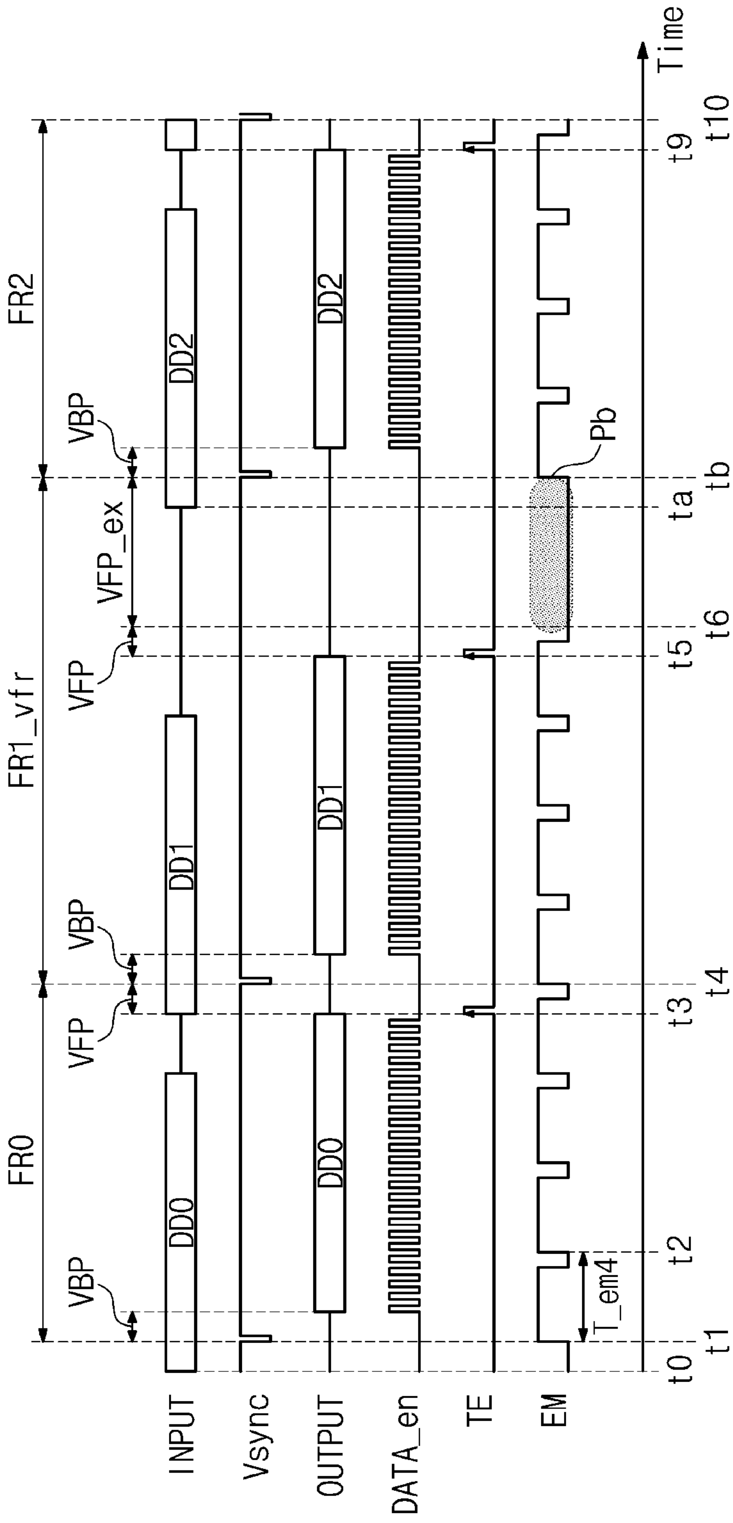

Referring to FIG. 3D, a DDI may provide the variable frame function. The remaining components other than the emission control signal EM are described with reference to the timing diagram of FIG. 3C, and thus, additional description will be omitted to avoid redundancy. According to the timing diagram of FIG. 3D, the emission control signal EM may be controlled according to the vertical synchronization signal Vsync. For example, as described above, to generate the emission control signal EM periodically as much as the given number of times during one frame period, the emission control signal EM may be generated in synchronization with the vertical synchronization signal Vsync.

In this case, as illustrated in a b-th period Pb of FIG. 3D, the duty ratio of the emission control signal EM may be changed. For example, an emission driver of the DDI may maintain of the emission control signal EM at the sixth time t6 until a time (i.e., the b-th time tb) when the next vertical synchronization signal Vsync is generated and may change the level of the emission control signal EM to the high level in synchronization with the timing when the vertical synchronization signal Vsync is generated. In this case, a timing (i.e., the b-th time tb) when the next vertical synchronization signal Vsync is generated may be changed according to an input timing of the second frame data DD2, and thus, the duty ratio of the emission control signal EM may change in the b-th period Pb.

As a result, in the case where the DDI provides the variable frame function, frame data may be normally output by changing a frame period, but a duty ratio of the emission control signal EM may be changed in a variable frame period. This may mean that a luminance change occurs at the display panel (e.g., during the variable frame period).

Figure 4:
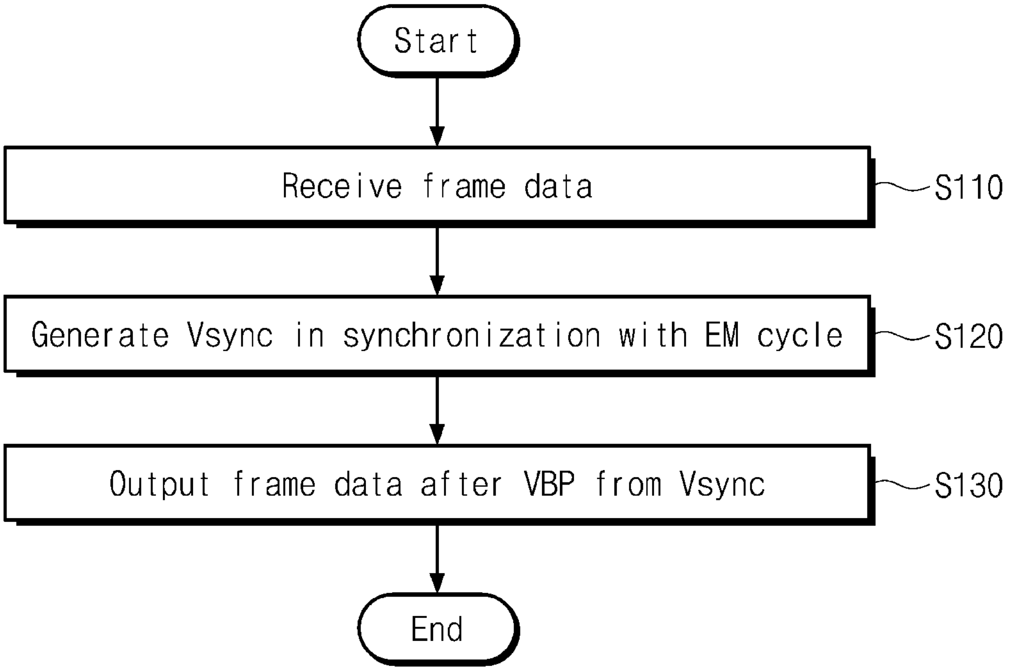
FIG. 4 is a flowchart illustrating an operation method of a DDI of FIG. 1, according to one example embodiment.

FIG. 4 is a flowchart illustrating an operation method of a DDI of FIG. 1. Below, to describe the technical idea of the present disclosure easily, it is assumed that target luminance to be expressed through the display panel 12 is uniformly maintained. To this end, the duty ratio and cycle of the emission control signal EM that is output from the DDI 100 may be uniformly maintained.

Referring to FIGS. 1 and 4, in operation S110, the DDI 100 may receive frame data. For example, the DDI 100 may receive the frame data DD from the application processor 11 through the interface circuit 101. In an embodiment, the received frame data DD may be stored in the frame buffer 120.

In operation S120, the DDI 100 may generate the vertical synchronization signal Vsync in synchronization with the cycle of the emission control signal EM. For example, as described with reference to FIGS. 3C and 3D, in the case where the input of the frame data DD to the DDI 100 is delayed, the DDI 100 may delay the generation of the vertical synchronization signal Vsync through the variable frame function. In this case, the DDI 100 according to an embodiment of the present disclosure may synchronize a timing to generate the vertical synchronization signal Vsync with the cycle of the emission control signal EM. For example, the timing to generate the vertical synchronization signal Vsync may be delayed in units of cycle of the emission control signal EM.

In operation S130, the DDI 100 may output the frame data DD to the display panel 12 after the vertical back porch VBP passes from a time when the vertical synchronization signal Vsync is generated. The display panel 12 may display an image corresponding to the frame data DD in response to the frame data DD, the emission control signal EM, and any other control signal (e.g., the gate signal GS), output from the DDI 100.

As described above, the vertical synchronization signal Vsync may be generated in synchronization with the cycle of the emission control signal EM. Alternatively, the timing to generate the vertical synchronization signal Vsync may be delayed in units of cycle of the emission control signal EM. In this case, a variable frame period may be defined in units of cycle of the emission control signal EM or may have a length corresponding to "n" times the cycle of the emission control signal EM. Accordingly, assuming that the emission control signal EM has the same duty ratio every cycle, the whole duty ratio of the emission control signal EM in the variable frame period may be uniformly maintained. Accordingly, a luminance change in the variable frame period may not occur.

Figure 5A:
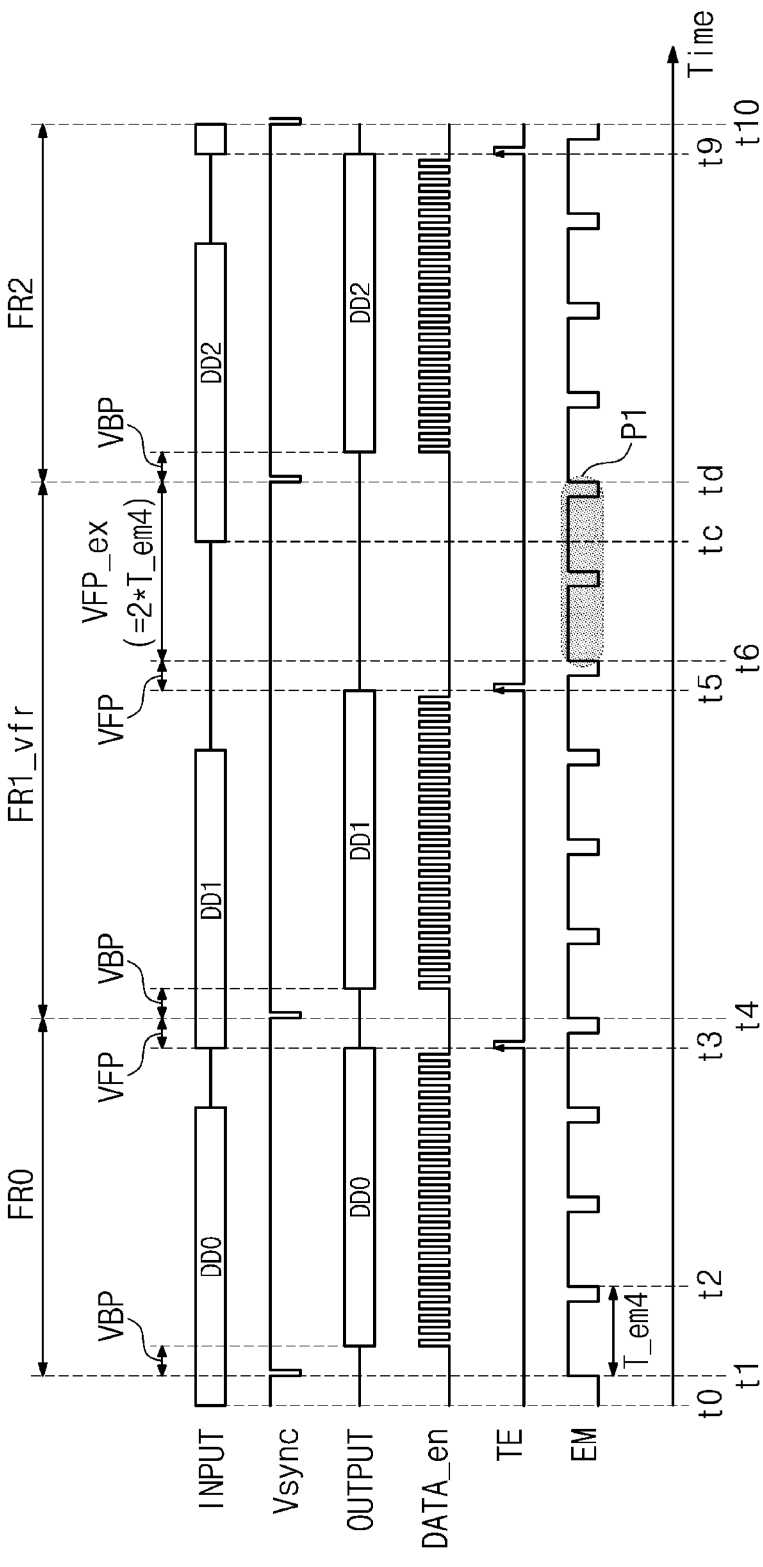
FIGS. 5A to 5C are timing diagrams for describing an operation of a DDI according to the flowchart of FIG. 4, according to one example embodiment.
Figure 5B:
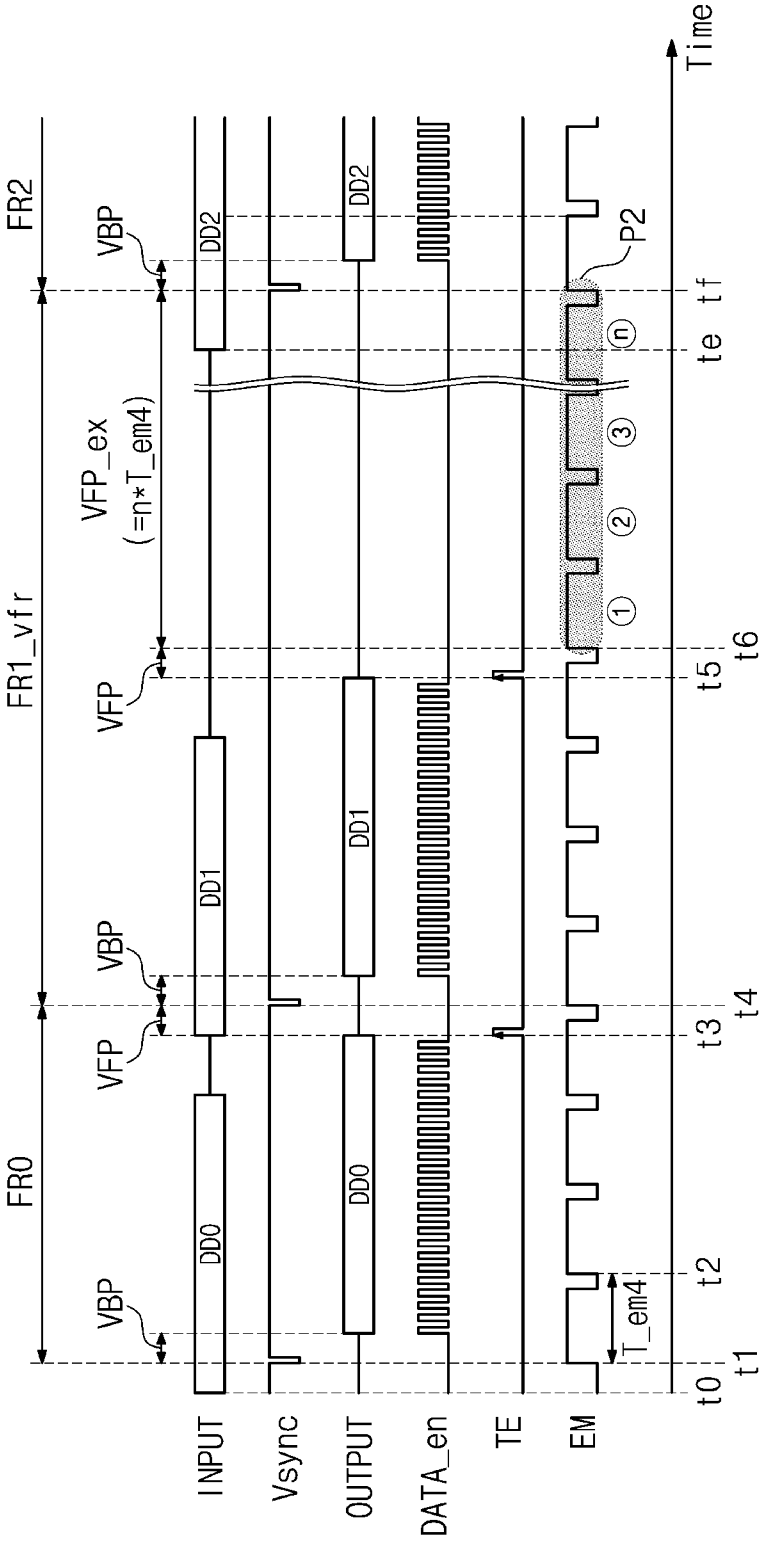
Figure 5C:
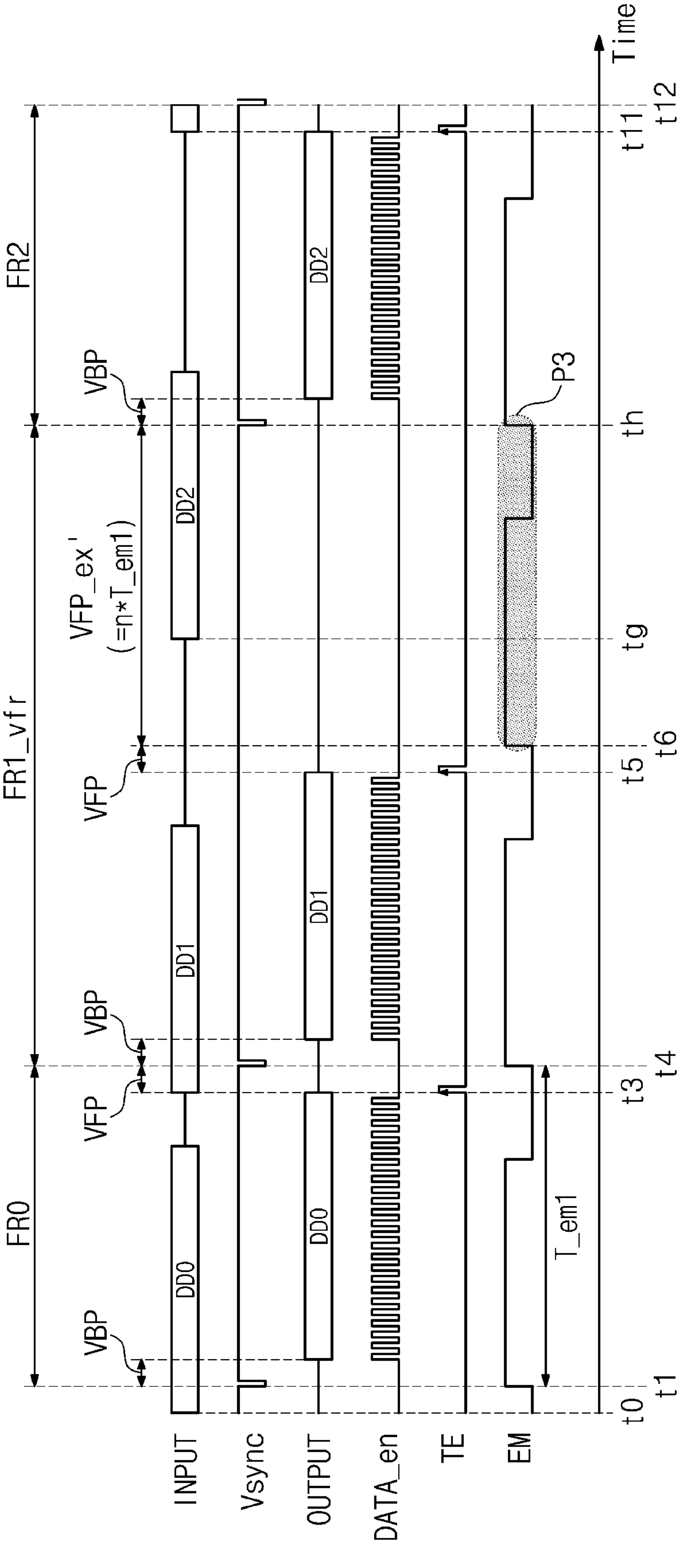

FIGS. 5A to 5C are timing diagrams for describing an operation of a DDI according to the flowchart of FIG. 4. In the timing diagrams of FIGS. 5A to 5C, a horizontal axis represents time. Reference signs used in the timing diagrams of FIG. 5A to 5C may be similar to the reference signs used in the timing diagrams of FIGS. 3A to 3D, and similar reference signs may have similar technical meanings. Accordingly, for convenience of description, additional description associated with the components described above will be omitted to avoid redundancy.

Below, for convenience of description, unless otherwise mentioned, it is assumed that target luminance to be expressed through the display panel 12 is uniform. For example, the emission control signal EM may be a PWM signal having the same cycle and the same duty ratio. Alternatively, the emission control signal EM may be controlled to have the same duty ratio in each of various frame periods.

Referring to FIGS. 1, 4, and 5A, an input of the second frame data DD2 from the application processor 11 to the DDI 100 may be delayed. For example, as illustrated in FIG. 5A, the application processor 11 may start to transmit the second frame data DD2 at a c-th time tc after the sixth time t6. In an embodiment, the sixth time t6 may be a time when the vertical front porch VFP passes from a time (i.e., t5) when frame data are completely transmitted in a current frame period (e.g., the first frame data DD1 are completely transmitted). In this case, the vertical front porch VFP may be a given time.

The DDI 100 may generate the vertical synchronization signal Vsync in response to the second frame data DD2 starting to be received. For example, the DDI 100 may sense (or recognize) a timing when the second frame data DD2 starts to be received (or input), by receiving a command corresponding to the second frame data DD2 through the interface circuit 101. The DDI 100 may generate the vertical synchronization signal Vsync in response to the command corresponding to the second frame data DD2. In an embodiment, in the case where the DDI 100 operates in the video mode supported by the MIPI DSI, the DDI 100 may generate the vertical synchronization signal Vsync based on an external vertical synchronization signal corresponding to the second frame data DD2, which is received from the application processor 11.

In this case, the vertical synchronization signal Vsync may be generated in synchronization with the cycle of the emission control signal EM. As described above, the emission control signal EM may be a signal that is generated by repeating a pulse signal with a uniform duty ratio at an interval corresponding to the cycle of T_em4. After the c-th time tc, the DDI 100 may generate the vertical synchronization signal Vsync at a time (i.e., a d-th time td) when the cycle of the emission control signal EM starts.

Alternatively, the vertical synchronization signal Vsync may be delayed as much as the expanded vertical front porch VFP_ex. In this case, a length of the expanded vertical front porch VFP_ex may correspond to the cycle of T_em4. In the embodiment illustrated in FIG. 5A, in this case, a length of the expanded vertical front porch VFP_ex may correspond to two times the cycle of T_em4. That is, the generation of the vertical synchronization signal Vsync may be delayed as much as a length corresponding to two times the cycle of T_em4.

As shown in the first period P1 of FIG. 5A, because the emission control signal EM has a uniform cycle (i.e., T_em4) and a uniform duty ratio, the duty ratio of the emission control signal EM may be uniformly maintained at the expanded vertical front porch VFP_ex. As a result, in the first variable frame period FR1_vfr, the duty ratio of the emission control signal EM may be uniformly maintained. As a result, a length of a time period from when the frame data DD1 of the first variable frame period FR1_vfr starts to be transmitted to the external display panel to when the frame data DD2 of the frame period FR2 starts to be transmitted to the external display panel is a particular number of times of the cycle of the emission control signal, where the particular number is a natural number. Also, a length of a time period from the time point t5 when the frame data DD1 is completed being output to the time point t9 when the frame data DD2 is completed being output is a particular number of times the cycle of the emission control signal, where the particular number is a natural number.

An embodiment is described with reference to the timing diagram of FIG. 5A as the vertical synchronization signal Vsync indicating an end of the first variable frame period FR1_vfr or a start of the second frame period FR2 is delayed as much as two times the cycle of the emission control signal EM, that is, 2*T_em4, but the present disclosure is not limited thereto.

For example, as illustrated in FIG. 5B, the expanded vertical front porch VFP_ex of the first variable frame period FR1_vfr may have a length corresponding to n times the cycle of the emission control signal EM, that is, n*T_em4. For example, as illustrated in FIG. 5B, at an e-th time te, the second frame data DD2 may start to be transmitted. The e-th time te may be included in the n-th cycle of the emission control signal EM from the sixth time t6. In this case, the DDI 100 may generate the vertical synchronization signal Vsync at an f-th time tf corresponding to a time when the n-th cycle of the emission control signal EM from the sixth time t6 ends or a time when the (n+1)-th cycle of the emission control signal EM from the sixth time t6 starts. In this case, because the emission control signal EM has the same duty ratio every cycle, as shown in a second period P2, the duty ratio of the emission control signal EM may be maintained.

Accordingly, the whole length of the first variable frame period FR1_vfr may be a multiple of the cycle T_em4 of the emission control signal EM, and the duty ratio of the emission control signal EM may be maintained in the whole period of the first variable frame period FR1_vfr.

In the above embodiments, the description is given as the cycle of the emission control signal EM is repeated four times in a fixed frame period (or in a frame period based on a given scan rate). However, the present disclosure is not limited thereto. For example, the cycle of the emission control signal EM may be variously changed or modified.

For example, as illustrated in FIG. 5C, the emission control signal EM may have a cycle of T_em1. The cycle of T_em1 may have a length corresponding to one fixed frame period (e.g., FR0). In this case, the fixed frame period may indicate a length corresponding to a given frame rate (e.g., 60 Hz or 120 Hz). As in the above description, even in the case where the emission control signal EM has the cycle of T_em1, the vertical synchronization signal Vsync may be generated in synchronization with the cycle of the emission control signal EM.

For example, as illustrated in FIG. 5C, in the case where the second frame data DD2 is received (or input) at a g-th time tg, the vertical synchronization signal Vsync may be generated at a h-th time th after the g-th time tg. The h-th time th may correspond to a time when the cycle of the emission control signal EM to which the g-th time tg belongs ends. In this case, as shown in a third period P3, the duty ratio of the emission control signal EM may be uniformly maintained in the expanded vertical front porch VFP_ex of the first variable frame period FR1_vfr, and thus, the duty ratio of the emission control signal EM may be uniformly maintained in the whole of the first variable frame period FR1_vfr.

In an embodiment, according to the above embodiments, the DDI 100 may generate the vertical synchronization signal Vsync in synchronization with the cycle of the emission control signal EM, in a variable frame period. In this case, when the target luminance is uniform, the cycle and duty ratio of the emission control signal EM may be uniformly maintained. Because the variable frame period has a length corresponding to n times the cycle of the emission control signal EM, the duty ratio of the emission control signal EM may be uniformly maintained during the variable frame period. As such, the luminance of an image to be displayed through the display panel 12 may be uniformly maintained in the variable frame period.

However, the present disclosure is not limited thereto. For example, an ON/OFF period of the emission control signal EM may be controlled to uniformly maintain a duty ratio of the emission control signal EM in a variable frame period. A way to control the ON/OFF period of the emission control signal EM will be more fully described with reference to the following drawings.

Figure 6:
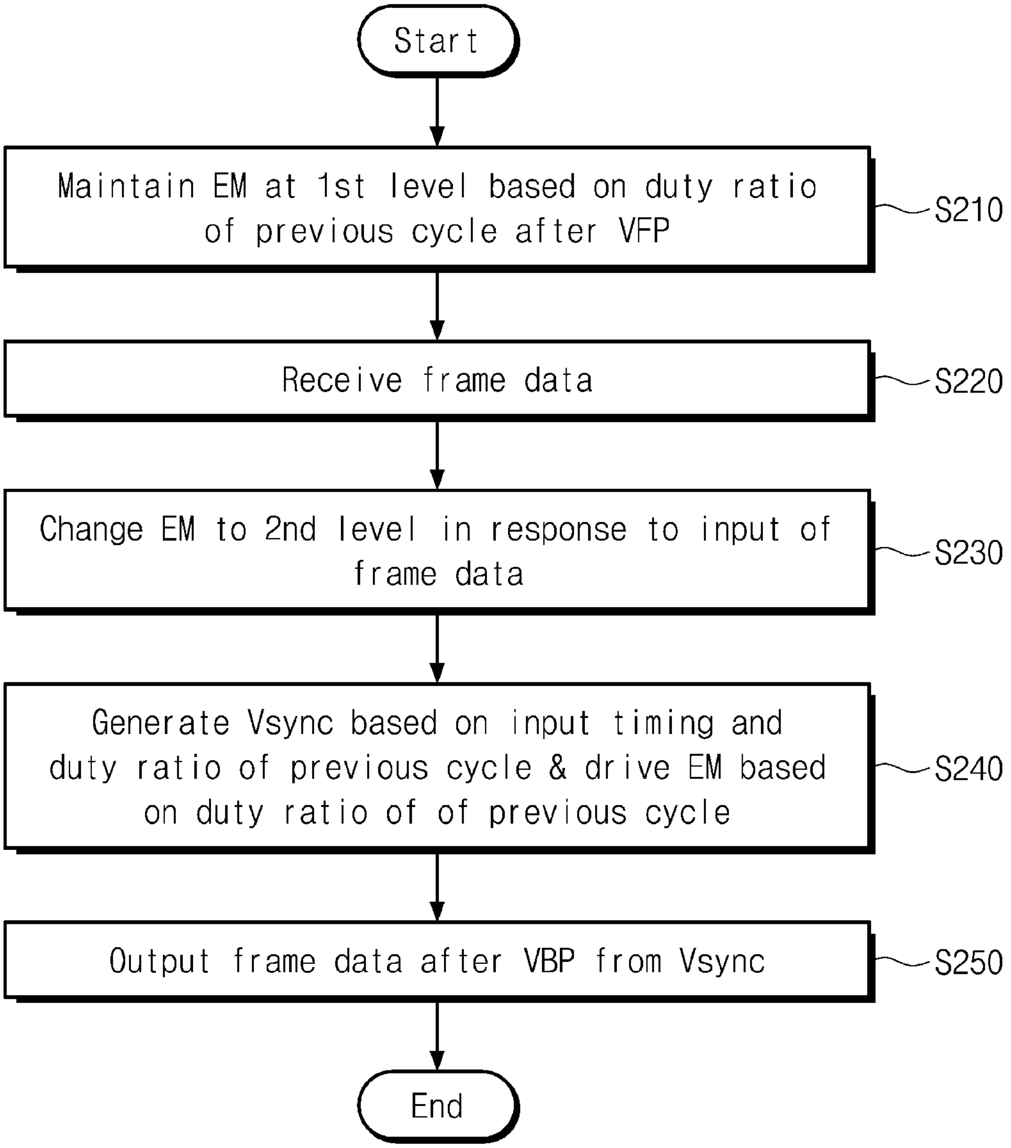
FIG. 6 is a flowchart illustrating an operation of a DDI of FIG. 1, according to one example embodiment.

FIG. 6 is a flowchart illustrating an operation of a DDI of FIG. 1. For convenience of description, additional description associated with the above components will be omitted to avoid redundancy, and an embodiment in which an input of frame data is delayed will be described above in FIG. 6. That is, in the flowchart of FIG. 6, frame data that are input to the DDI 100 may be received from the application processor 11 after the vertical front porch VFP in a current frame period passes. This may mean that a variable frame period occurs.

Referring to FIGS. 1 and 6, in operation S210, after the vertical front porch VFP passes from a time when frame data are completely transmitted, the DDI 100 may maintain the emission control signal EM at a first level based on a duty ratio of a previous cycle. The first level may be one of the high level and the low level and may be determined based on a duty ratio (e.g., an OFF duty ratio or an ON duty ratio) of a previous cycle.

In operation S220, the DDI 100 may receive the frame data DD from the application processor 11. In this case, the frame data DD may be received after the vertical front porch VFP of a current frame period passes. For example, a variable frame period may occur due to the frame data DD received in operation S220. The received frame data DD may be stored in the frame buffer 120.

In operation S230, the DDI 100 may change the emission control signal EM to a second level in response to an input of frame data. For example, the DDI 100 may sense an input of frame data in response to a command for the frame data. The DDI 100 may control the emission control signal EM in response to the input of the frame data. In this case, the second level may be a level that is opposite to the first level in operation S210. That is, when the first level is the high level, the second level may be the low level; when the first level is the low level, the second level may be the high level.

In operation S240, the DDI 100 may generate the vertical synchronization signal Vsynbased on a duty ratio of a previous cycle of the emission control signal EM and an input timing of the frame data DD. The DDI 100 may drive the emission control signal EM based on the duty ratio of the previous period.

For example, in the case where a variable frame period occurs, the DDI 100 may maintain the duty ratio of the emission control signal EM in the variable frame period by controlling a level of the emission control signal EM through operation S210 to operation S240.

In detail, it is assumed that an OFF duty ratio of the emission control signal EM corresponding to target luminance is 30%. In this case, in one cycle of the emission control signal EM, an OFF level may be maintained as much as 30% of one cycle, and an ON level may be maintained as much as 70% of one cycle. According to the above assumption, the DDI 100 may maintain the emission control signal EM at a first level (e.g., an ON level) from when the vertical front porch VFP in a current frame period ends to when frame data starts to be received. At a time when the frame data are received, the DDI 100 may change the emission control signal EM to a second level (e.g., an OFF level). Afterwards, the DDI 100 may generate the vertical synchronization signal Vsync such that a ratio of a first time period from when the vertical front porch VFP in the current frame period ends to when frame data starts to be received, to a second time period from when the frame data starts to be received to when the vertical synchronization signal Vsync is generated is 7:3.

In this case, the expanded vertical front porch VFP_ex may be from when the vertical front porch VFP in the current frame period ends to when the vertical synchronization signal Vsync is generated, and the duty ratio of the emission control signal EM in the expanded vertical front porch VFP_ex may be maintained at 7:3 depending on the above control manner. Operation S240 will be more fully described with reference to the following drawings.

In operation S250, the DDI 100 may output frame data after the vertical back porch VBP passes from a time when the vertical synchronization signal Vsync is generated.

As described above, the DDI 100 may maintain the duty ratio of the emission control signal EM in the expanded vertical front porch VFP_ex by controlling a level of the emission control signal EM during the expanded vertical front porch VFP_ex of the variable frame period. As such, the whole duty ratio of the emission control signal EM in the variable frame period may be maintained.

Figure 7:
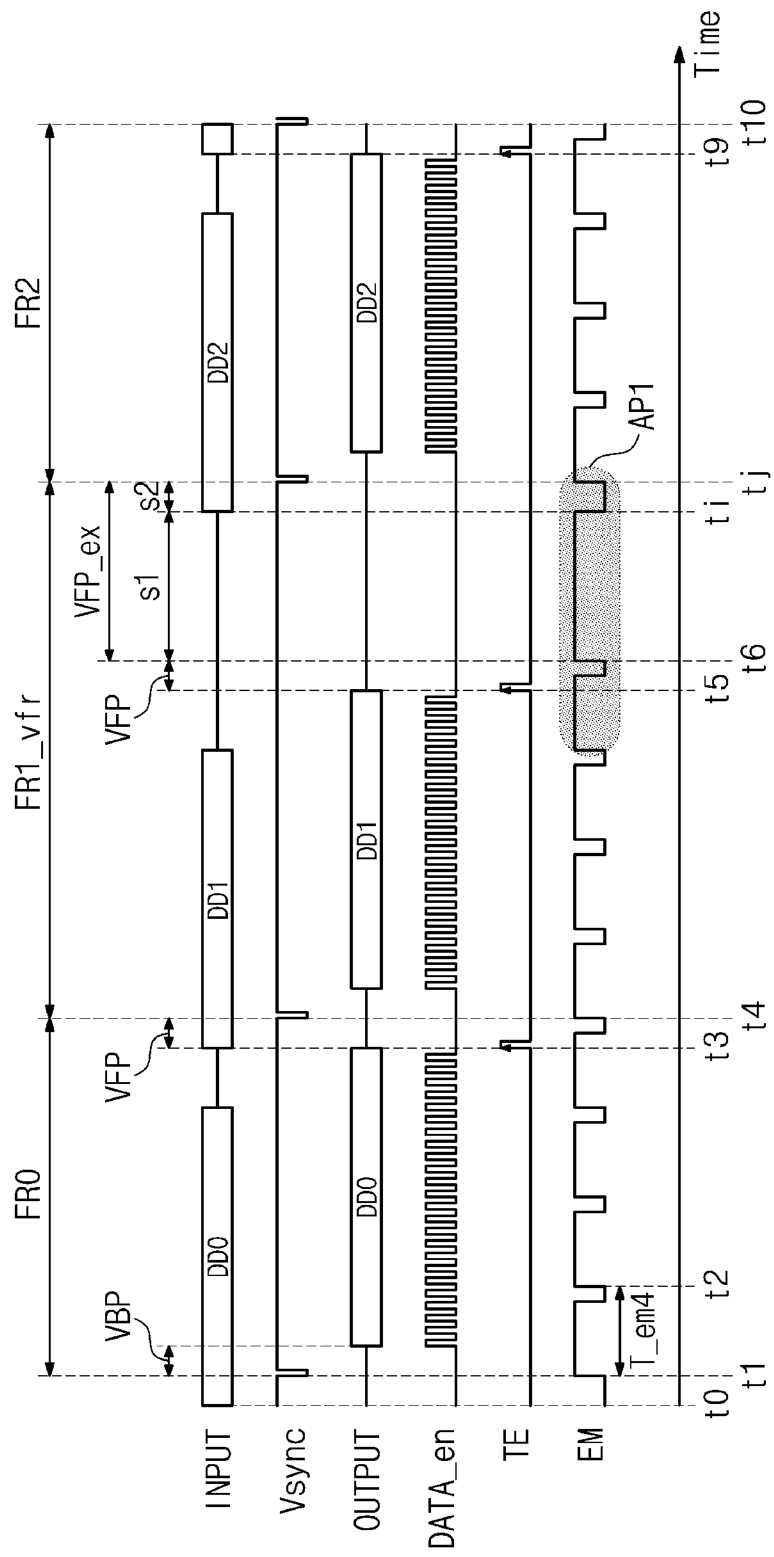
FIG. 7 is a timing diagram for describing an operation according to the flowchart of FIG. 6, according to one example embodiment.

FIG. 7 is a timing diagram for describing an operation according to the flowchart of FIG. 6. For convenience of description, additional description associated with the components described above will be omitted to avoid redundancy. Referring to FIGS. 1, 6, and 7, the second frame data DD2 may be input at an i-th time t1 after the sixth time t6. As described with reference to operation S210 of FIG. 6, in a current frame period (i.e., the first variable frame period FR1_vfr), the DDI 100 may detect that receipt of the second frame data DD2 is delayed (e.g., by detecting passing of the vertical front porch VFP without subsequently receiving the second frame data DD2), and then the emission control signal EM as well as the Vsync may be controlled based on that detection. The DDI 100 may then set and maintain a level of the emission control signal EM at the high level from the sixth time t6 when the vertical front porch VFP passes to the i-th time ti when the second frame data DD2 are input. Afterwards, at a j-th time tj, the vertical synchronization signal Vsync may be generated. The emission control signal EM may maintain the low level during a period from the i-th time ti when the second frame data DD2 are input to the j-th time tj when the vertical synchronization signal Vsync is generated.

In this case, in the first variable frame period FR1_vfr, the vertical synchronization signal Vsync may be delayed as much as the expanded vertical front porch VFP_ex. The expanded vertical front porch VFP_ex may be a time period from the sixth time t6 to the j-th time tj. The expanded vertical front porch VFP_ex may be divided into a first sub-period s1 and a second sub-period s2. The first sub-period s1 may be a time period from the sixth time t6 to the i-th time ti, and the second sub-period s2 may be a time period from the i-th time ti to the j-th time tj.

The first sub-period s1 may indicate a time period from the sixth time t6 when the vertical front porch VFP ends to the i-th time ti when next frame data (e.g., the second frame data DD2) starts to be received, in the current frame period (e.g., the first variable frame period FR1_vfr). The second sub-period s2 may indicate a time period from the i-th time ti when next frame data (e.g., the second frame data DD2) starts to be received to the j-th time tj when the vertical synchronization signal Vsync is generated.

The emission control signal EM may maintain the high level during the first sub-period s1 and may maintain the low level during the second sub-period s2. In this case, a ratio of the first sub-period s1 and the second sub-period s2 may be identical to a duty ratio of a previous cycle of the emission control signal EM. For example, the DDI 100 may manage information about a cycle and a duty ratio of the emission control signal EM. A ratio of the first sub-period s1 and the second sub-period s2 may be determined by Equation 1 below.

$$DR_{pre} = \frac{\text{OFF time}(s2)}{\text{ON time}(s1) + \text{OFF time}(s2)} \quad \text{[Equation 1]}$$

$$\text{OFF time}(s2) = \frac{DR_{pre}}{1 - DR_{pre}} \text{ON time}(s1)$$

In Equation 1 above, "DRpre" may indicate a duty ratio (e.g., a duty ratio of the OFF level, that is, OFF/(OFF+ON)) of a previous cycle of the emission control signal EM, "OFF time" may indicate a length of the second sub-period s2, and "ON time" may indicate a length of the first sub-period s1.

In this case, "DRpre" has a value defined in advance depending on target luminance. Because the ON time corresponds to a period from the vertical front porch VFP of the current frame period to a time when the second frame data DD2 are input (i.e., a period from t6 to ti), the ON time may be detected by the DDI 100. Accordingly, a length of the second sub-period s2 may be determined according to Equation 1 above, and a timing (i.e., tj) to generate the vertical synchronization signal Vsync may be determined depending on the length of the second sub-period s2.

An embodiment in which the emission control signal EM is at the ON level in the first sub-period s1 and is at the OFF level in the second sub-period s2 is described with reference to Equation 1 above, but the present disclosure is not limited thereto. For example, a level of each of the first and second sub-periods s1 and s2 may be determined by a duty ratio of a previous cycle. This will be more fully described with reference to FIGS. 8 to 9B.

In an embodiment, after the first variable frame period FR1_vfr ends (i.e., after the j-th time tj when the vertical synchronization signal Vsync is generated), the emission control signal EM may be driven to have an original cycle (e.g., a cycle of T_em4) and an original duty ratio.

As described above, a duty ratio of the emission control signal EM in a variable frame period may be uniformly maintained by controlling the emission control signal EM or the vertical synchronization signal Vsync based on an input timing of next frame data (e.g., DD2) and a duty ratio of the previous emission control signal EM. The duty ratio of the emission control signal EM during the variable frame period may be the same as the duty ratio of the emission control signal EM in the other, standard periods.

Figure 8:
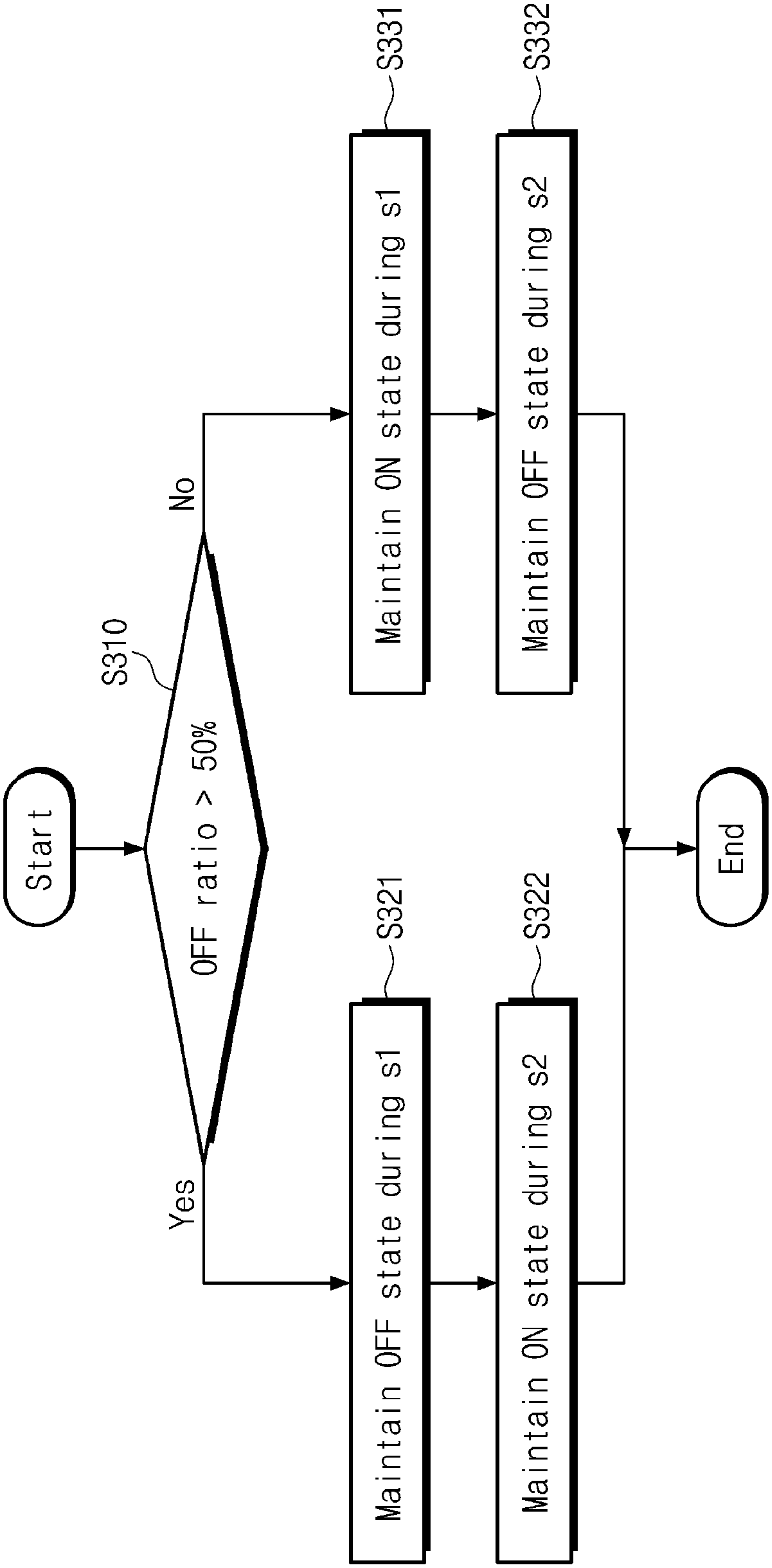
FIG. 8 is a flowchart illustrating an operation of controlling an emission control signal in a variable period of FIG. 7, according to one example embodiment.
Figure 9A:
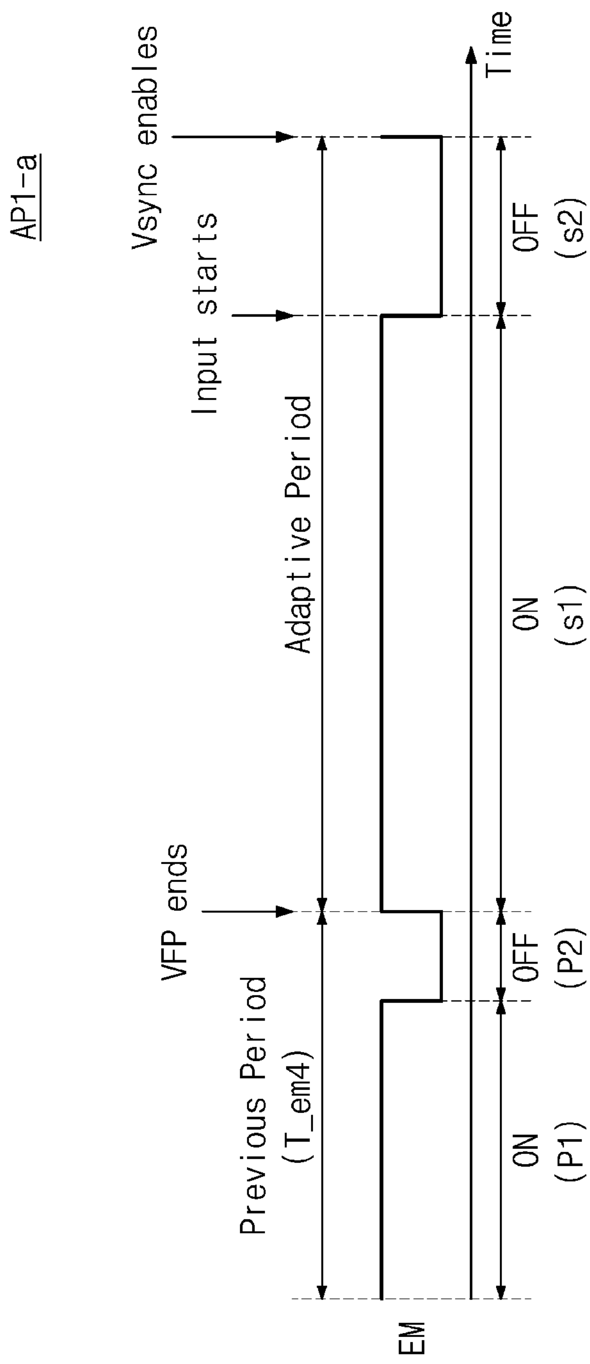
FIGS. 9A and 9B are timing diagrams for describing an operation according to the flowchart of FIG. 8, according to one example embodiment.
Figure 9B:
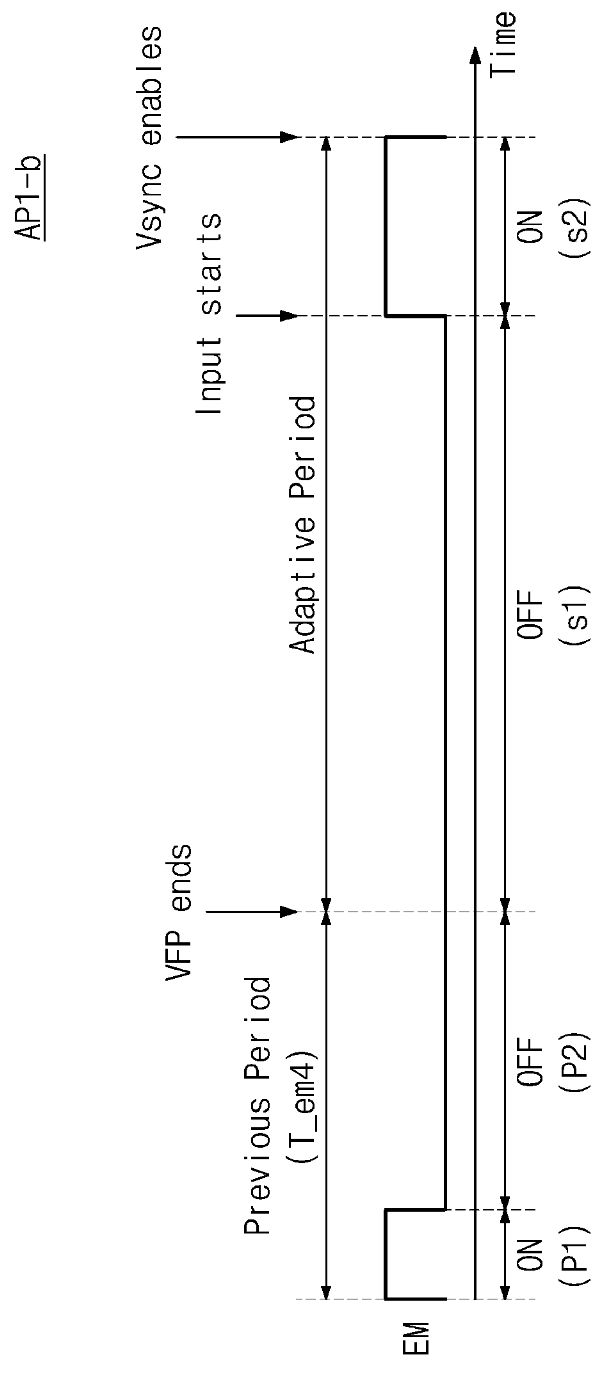

FIG. 8 is a flowchart illustrating an operation of controlling an emission control signal in a variable period of FIG. 7. FIGS. 9A and 9B are timing diagrams for describing an operation according to the flowchart of FIG. 8.

For convenience of description, it is assumed that operation S310 of FIG. 8 starts at the sixth time t6 of FIG. 7. For example, when an input of a next frame data does not exist at a time (e.g., t6) when the vertical front porch VFP passes from a time (e.g., t5) when current frame data (e.g., DD1) are completely output, operation S310 may be performed.

Referring to FIGS. 1, 7, and 8, in operation S310, the DDI 100 may determine a duty ratio of a previous cycle of the emission control signal EM. For example, the DDI 100 may determine whether a duty ratio of an OFF level is greater than 50% in the previous cycle of the emission control signal EM. Alternatively, the DDI 100 may manage target luminance in a current frame period and a duty ratio of the emission control signal EM corresponding to the target luminance. The DDI 100 may perform operation S310 based on the managed duty ratio (i.e., the duty ratio corresponding to the target luminance).

When the duty ratio of the OFF level is greater than 50%, in operation S321, the DDI 100 may maintain a level of the emission control signal EM at the OFF level during the first sub-period s1 of the expanded vertical front porch VFP_ex. Afterwards, in operation S322, the DDI 100 may set a level of the emission control signal EM to the ON level during the second sub-period s2 of the expanded vertical front porch VFP_ex.

When the duty ratio of the OFF level is not greater than 50%, in operation S331, the DDI 100 may set a level of the emission control signal EM to the ON level during the first sub-period s1 of the expanded vertical front porch VFP_ex. Afterwards, in operation S322, the DDI 100 may set a level of the emission control signal EM to the OFF level during the second sub-period s2 of the expanded vertical front porch VFP_ex.

The first and second sub-periods s1 and s2 may be determined based on an output complete timing of current frame data, the vertical front porch VFP, an input timing of next frame data, and a duty ratio of the emission control signal EM. In this case, the vertical synchronization signal Vsyn may be generated when the second sub-period s2 ends.

As described above, in a variable period VP1, an initial level of the emission control signal EM (i.e., a level of the first sub-period s1) may be determined depending on a duty ratio of the emission control signal EM. For example, as illustrated in FIG. 9A, the emission control signal EM may have a cycle of T_em4. In this case, in a period of a previous cycle, that is, in a previous period, the emission control signal EM may be ON in a first period P1 and may be OFF during a second period P2. The vertical front porch VFP may end when the second period P2 ends.

In this case, based on a magnitude of an OFF duty ratio (e.g., P2/(P1+P2)) in the previous period, the DDI 100 may determine a level of an adaptive period or a level of the first sub-period s1 of the expanded vertical front porch VFP_ex. In the embodiment of FIG. 9A, because a length of the first period P1 is greater than a length of the second period P2, the OFF duty ratio may be smaller than 50%. In this case, the DDI 100 may maintain a level of the emission control signal EM at an ON level during the first sub-period s1. Afterwards, the DDI 100 may maintain a level of the emission control signal EM at an OFF level during the second sub-period s2. In this case, the first sub-period s1 may indicate a time period from when the vertical front porch VFP ends to when an input of frame data starts, and the second sub-period s2 may indicate a time period from the input of the frame data starts to when the vertical synchronization signal Vsyn is generated. In this case, the OFF duty ratio (i.e., P2/(P1+P2)) in a period of a previous cycle may be identical to an OFF duty ratio (i.e., s2/(s1+s2)) in an adaptive period.

In contrast, like the embodiment of FIG. 9B, in a period of a previous cycle, that is, in a previous period, the emission control signal EM may be ON in a first period P1 and may be OFF during a second period P2. In this case, because a length of the first period P1 is smaller than a length of the second period P2, the OFF duty ratio may be greater than 50%. According to the above condition, the DDI 100 may maintain the emission control signal EM at the OFF level during the first sub-period s1 and may set and maintain the emission control signal EM to the ON level during the second sub-period s2. The first and second sub-periods s1 and s2 are described above, and thus, additional description will be omitted to avoid redundancy.

In this case, an OFF duty ratio (i.e., P2/(P 1+P2)) in the previous period may be identical to an OFF duty ratio (i.e., s1/(s1+s2)) in an adaptive period. In an embodiment, the adaptive period may be the expanded vertical front porch VFP_ex described above.

As described above, as the DDI 100 controls a duty ratio of the emission control signal EM in the expanded vertical front porch VFP_ex, the duty ratio of the emission control signal EM may be maintained in the variable frame period.

Figure 10:
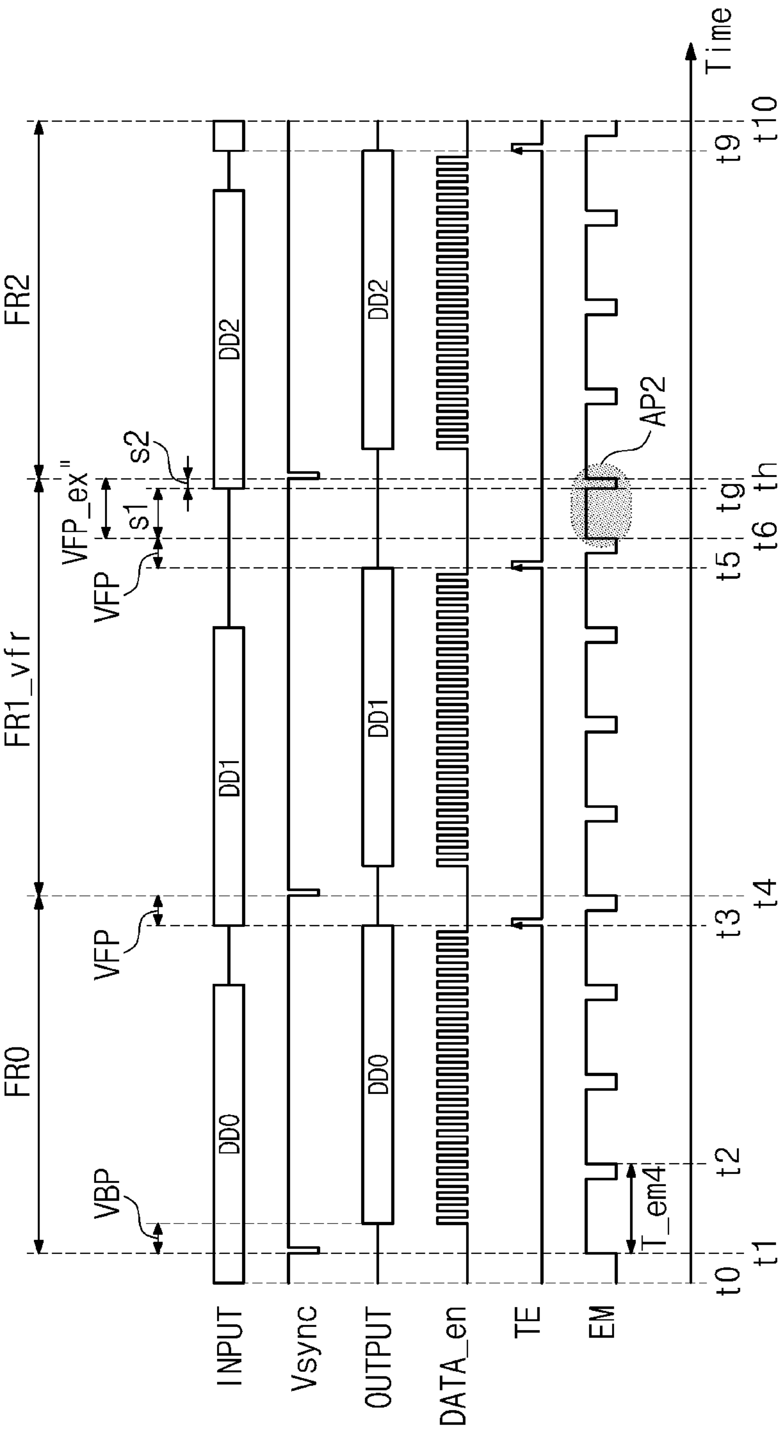
FIG. 10 is a timing diagram for describing an operation according to the flowchart of FIG. 6, according to one example embodiment.

FIG. 10 is a timing diagram for describing an operation according to the flowchart of FIG. 6. For convenience of description, additional description associated with the components described above will be omitted to avoid redundancy. In a way to control the emission control signal EM, which is described with reference to FIG. 7, the expanded vertical front porch VFP_ex is illustrated as longer than the cycle of T_em4 being a cycle of the emission control signal EM. However, the present disclosure is not limited thereto.

For example, referring to FIGS. 1, 6, and 10, the second frame data DD2 may be input at a g-th time tg after the sixth time t6. The DDI 100 may change a level of the emission control signal EM (e.g., from the ON level to the OFF level) in response to the input of the second frame data DD2. The DDI 100 may generate the vertical synchronization signal Vsync such that a target duty ratio of the emission control signal EM is identical to a duty ratio of the emission control signal EM in the expanded vertical front porch VFP_ex. In this case, as illustrated in FIG. 10, the expanded vertical front porch VFP_ex may be shorter than T_em4 being the cycle of the emission control signal EM. The DDI in this case may detect the time tg when the input of the second data frame DD2 is first received, and then the emission control signal EM as well as the Vsync may be controlled based on that time tg.

As such, the DDI 100 according to an embodiment of the present disclosure may control timings of the emission control signal EM and the vertical synchronization signal Vsync such that the target duty ratio of the emission control signal EM is the same as (e.g., identical to) the duty ratio of the emission control signal EM in the expanded vertical front porch VFP_ex.

Figure 11A:
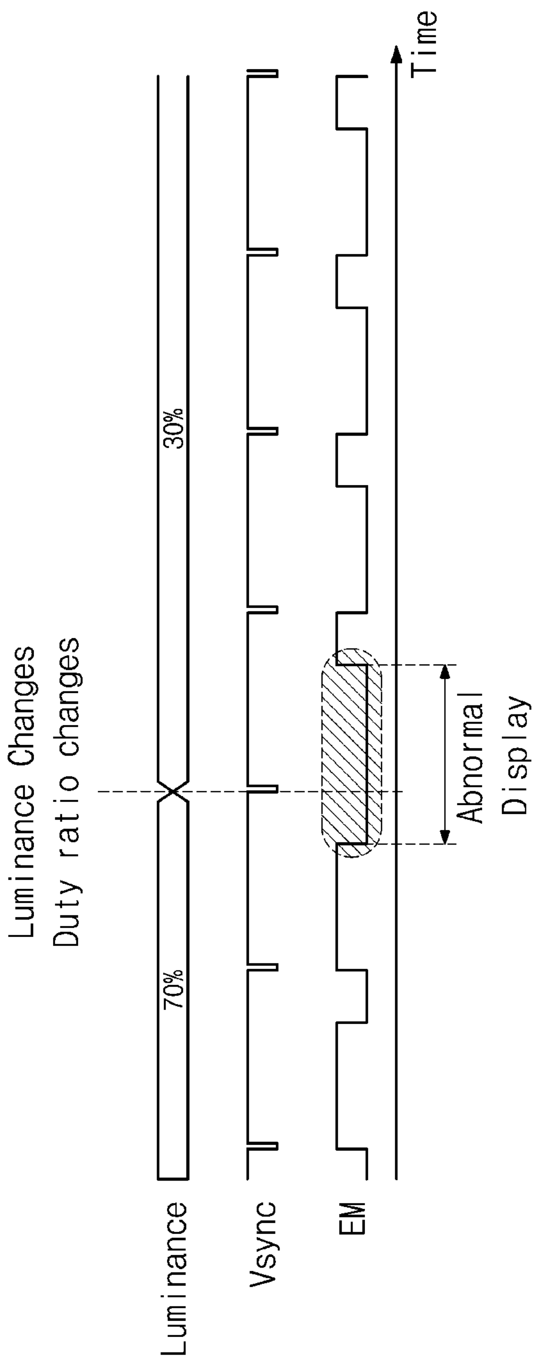
FIGS. 11A and 11B are timing diagrams for describing an operation of a DDI of FIG. 1, according to one example embodiment.
Figure 11B:
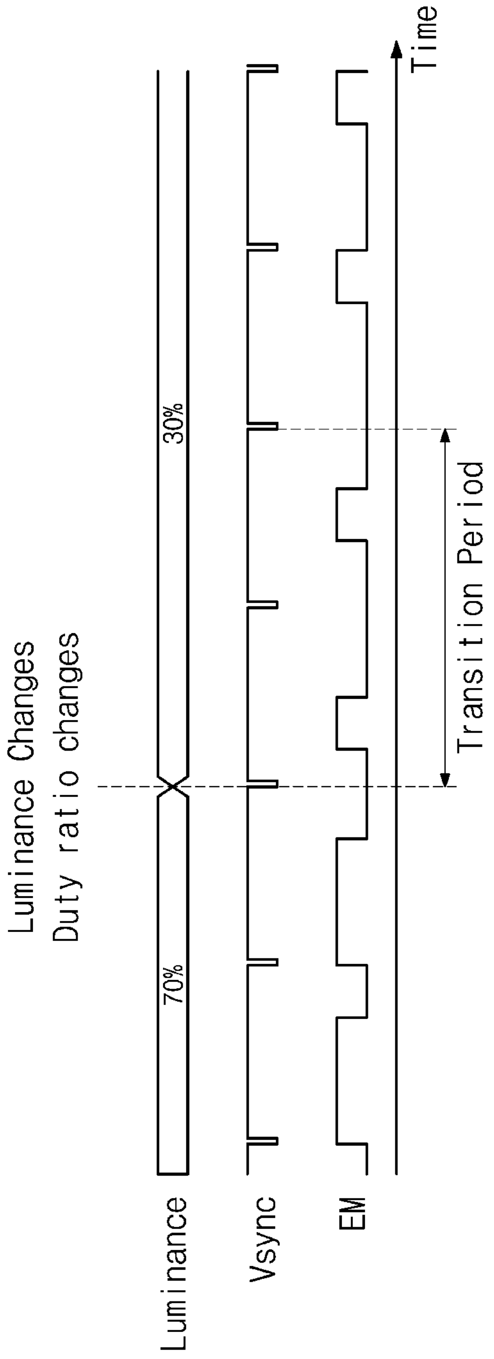

FIGS. 11A and 11B are timing diagrams for describing an operation of a DDI of FIG. 1. In an embodiment, a configuration where the DDI 100 controls an emission control signal when target luminance of the display panel 12 is changed will be described with reference to FIGS. 11A and 11B.

Referring to FIGS. 1, 11A, and 11B, the DDI 100 may be configured to control a duty ratio or a cycle of the emission control signal EM based on luminance information received from the application processor 11. When the luminance information received from the application processor 11 is changed (e.g., from 70% to 30%), the DDI 100 may adjust the duty ratio of the emission control signal EM.

In this case, as in the above operation described with reference to the flowchart of FIG. 8, the DDI 100 may adjust the duty ratio of the emission control signal EM. For example, when luminance is 70%, because a time of the ON level is longer than a time of the OFF level in one cycle of the emission control signal EM, an initial value of each cycle may be set to the ON level. In contrast, when luminance is 30%, because a time of the OFF level is longer than a time of the ON level, an initial value of each cycle may be set to the OFF level. That is, when the luminance changes from 70% to 30%, at a timing when the luminance changes, the emission control signal EM may be maintained at the OFF level. In this case, abnormal luminance may be expressed through the display panel 12.

When luminance changes (e.g., from 70% to 30%), as illustrated in FIG. 11B, the DDI 100 according to an embodiment of the present disclosure may vary a timing of the emission control signal EM during a plurality of frame periods. In this case, the plurality of frame periods may constitute a transition period. During the transition period, the emission control signal EM may have a target duty ratio (i.e., a duty ratio corresponding to the luminance of 30%). During the transition period, a cycle of the emission control signal EM may be irregular.

During the transition period, the expression of abnormal luminance illustrated in FIG. 11A may be prevented by controlling timings of the ON level and the OFF level of the emission control signal EM, with the duty ratio of the emission control signal EM maintained at the target duty ratio.

Figure 12:
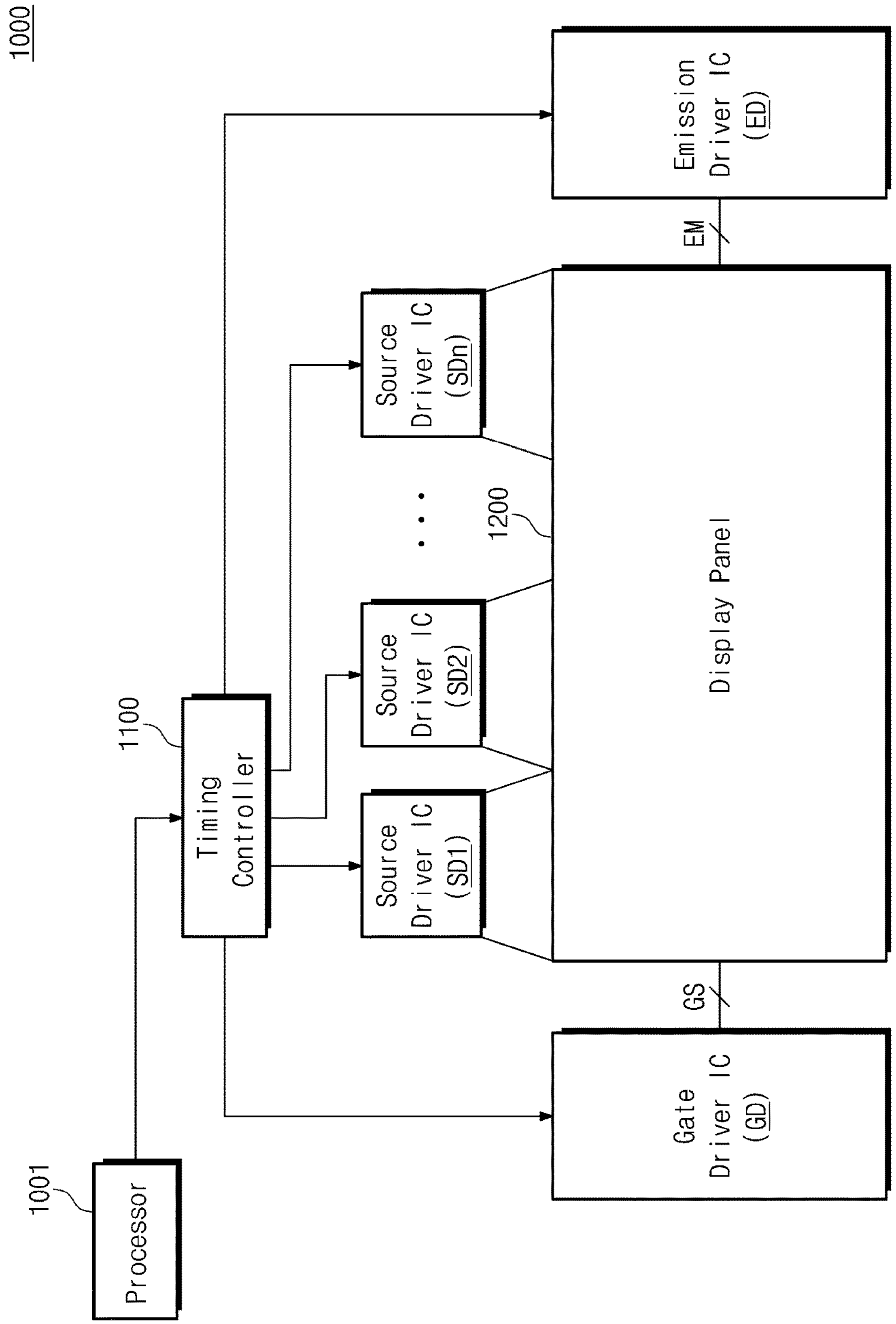
FIG. 12 is a block diagram illustrating a display device according to an embodiment of the present disclosure.

FIG. 12 is a block diagram illustrating a display device according to an embodiment of the present disclosure. Referring to FIG. 12, a display device 1000 may include a processor 1001, a timing controller 1100, a plurality of source driver integrated circuits SD1 to SDn, a gate driver integrated circuit GD, an emission driver integrated circuit ED, and a display panel 1200.

The processor 1001 may be configured to process image data to be displayed through the display panel 1200. In an embodiment, the processor 1001 may include a graphic processing unit (GPU) configured to process image data.

Under control of the processor 1001, the timing controller 1100 may control the plurality of source driver integrated circuits SD1 to SDn, the gate driver integrated circuit GD, and the emission driver integrated circuit ED such that an image is displayed through the display panel 1200. In an embodiment, the timing controller 1100 may operate based on the operation method of the DDI 100 described with reference to FIGS. 1 to 11. That is, the timing controller 1100 may control the emission driver integrated circuit ED such that target luminance is expressed through the display panel 1200. The timing controller 1100 may provide the variable frame function. In this case, in a variable frame period, the timing controller 1100 may generate the vertical synchronization signal Vsync in synchronization with the emission control signal EM such that luminance to be expressed through the display panel 1200 does not change (or a duty ratio of the emission control signal EM is maintained). Alternatively, in the variable frame period, the timing controller 1100 may control the emission control signal EM such that luminance to be expressed through the display panel 1200 does not change (or a duty ratio of the emission control signal EM is maintained).

The plurality of source driver integrated circuits SD1 to SDn may be connected with the display panel 1200 through a plurality of data lines and may be configured to drive the plurality of data lines under control of the timing controller 1100.

The gate driver integrated circuit GD may be connected with the display panel 1200 through a plurality of gate lines and may provide the gate signal GS to the plurality of gate lines under control of the timing controller 1100.

The emission driver integrated circuit ED may be connected with the display panel 1200 through a plurality of emission control lines and may provide the emission control signal EM to the plurality of emission control lines under control of the timing controller 1100. In an embodiment, the emission control signal EM may be a pulse signal or a pulse width modulation (PWM) signal, which has a cycle and a duty ratio corresponding to target luminance under control of the timing controller 1100.

Figure 13:
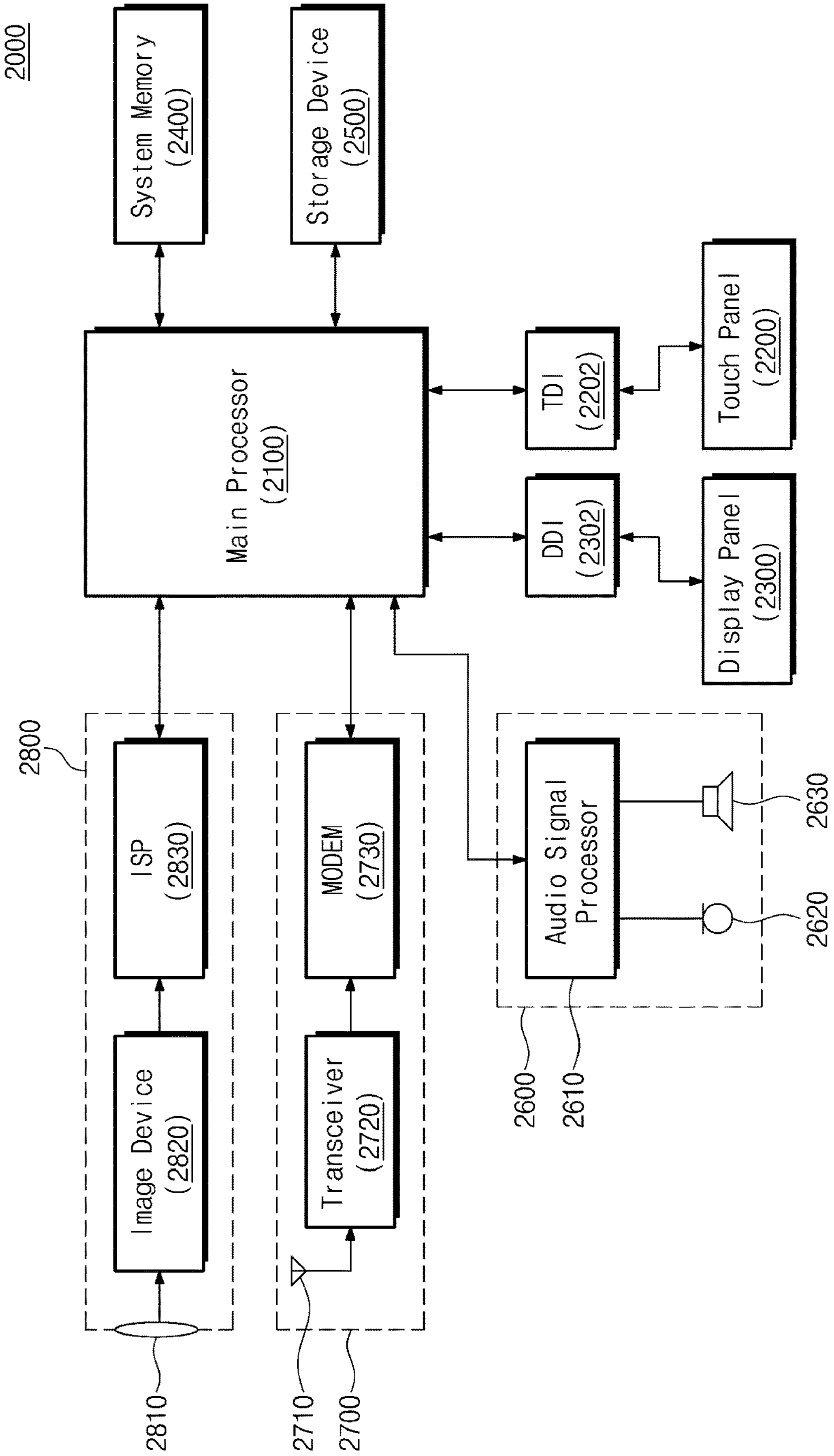
FIG. 13 is a block diagram illustrating an electronic device according to an embodiment of the present disclosure.

FIG. 13 is a block diagram illustrating an electronic device according to the present disclosure. Referring to FIG. 13, an electronic device 2000 may include a main processor 2100, a touch panel 2200, a touch driving integrated circuit 2202, a display panel 2300, a display driving integrated circuit 2302, a system memory 2400, a storage device 2500, an audio processor 2600, a communication block 2700, and an image processor 2800. In an embodiment, the electronic device 2000 may be one of various electronic devices such as a portable communication terminal, a personal digital assistant (PDA), a portable media player (PMP), a digital camera, a smartphone, a tablet computer, a laptop computer, and a wearable device or may be one of various communication devices, which support a wireless communication relay function, such as a wireless router and a wireless communication base station. In an embodiment, the electronic device 2000 may further include any other components in addition to the components illustrated in FIG. 13 or may not include some of the components illustrated in FIG. 13.

The main processor 2100 may control overall operations of the electronic device 2000. The main processor 2100 may control/manage operations of the components of the electronic device 2000. The main processor 2100 may process various operations for the purpose of operating the electronic device 2000.

The touch panel 2200 may be configured to sense a touch input from a user under control of the touch driving integrated circuit 2202. The display panel 2300 may be configured to display image information under control of the display driving integrated circuit 2302. In an embodiment, the display driving integrated circuit 2302 may be the DDI described with reference to FIGS. 1 to 12 or may operate based on the operation method described with reference to FIGS. 1 to 12.

The system memory 2400 may store data that are used for an operation of the electronic device 2000. For example, the system memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The storage device 2500 may store data regardless of whether a power is supplied. For example, the storage device 2500 may include at least one of various nonvolatile memories such as a flash memory, a PRAM, an MRAM, a ReRAM, and a FRAM. For example, the storage device 2500 may include an embedded memory and/or a removable memory of the electronic device 2000.

The audio processor 2600 may process an audio signal by using an audio signal processor 2610. The audio processor 2600 may receive an audio input through a microphone 2620 or may provide an audio output through a speaker 2630.

The communication block 2700 may exchange signals with an external device/system through an antenna 2710. A transceiver 2720 and a modulator/demodulator (MODEM) 2730 of the communication block 2700 may process signals exchanged with the external device/system, based on at least one of various wireless communication protocols: long term evolution (LTE), worldwide interoperability for microwave access (WiMax), global system for mobile communication (GSM), code division multiple access (CDMA), Bluetooth, near field communication (NFC), wireless fidelity (Wi-Fi), and radio frequency identification (RFID).

The image processor 2800 may receive a light through a lens 2810. An image device 2820 and an image signal processor (ISP) 2830 included in the image processor 2800 may generate image information about an external object, based on a received light.

According to embodiments of the present disclosure, a display driving integrated circuit may perform an adaptive frame operation. In this case, the display driving integrated circuit may generate a vertical synchronization signal in synchronization with a cycle of an emission control signal for controlling luminance of a display panel. Alternatively, or additionally, the display driving integrated circuit may control a level of the emission control signal such that a duty ratio of the emission control signal is maintained in a variable frame period. According to the above description, in the variable frame period, luminance of an image output through the display panel may be maintained. Accordingly, a display driving integrated circuit configured to perform the adaptive frame operation providing an image of an improved quality and an operation method thereof are provided.

Terms such as "same," or "equal," as used herein when referring to timing or other measures do not necessarily mean an identical timing or other measure, but is intended to encompass nearly identical timing within acceptable variations that may occur without noticeably affecting operation. The term "substantially" may be used herein to emphasize this meaning, unless the context or other statements indicate otherwise. For example, items or timings described as "substantially the same" or "substantially equal" may be exactly the same or equal, or may be the same or equal within acceptable variations that may occur, for example, without noticeably affecting operation.

It will be understood that, although the terms first, second, third etc. may be used herein to describe various elements, components, time points, time periods, etc., these terms should not be limited by these numerical labels. Unless the context indicates otherwise, these numerical labels are only used to distinguish one element, component, time point, time period, etc., from another, for example as a naming convention. Thus, a first element, component, time point, time period, etc., discussed below in one section of the specification could be termed a second element, component, time point, time period, etc., in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a display driving integrated circuit which performs an adaptive frame operation that adapts for frame delays in a given frame rate, the operation method comprising:

outputting first frame data to an external display panel;

starting to receive second frame data from an external device at a third time point being after a second time point when a vertical front porch (VFP) passes, the VFP beginning at a first time point when the first frame data are completely output, the second frame data being delayed with respect the given frame rate; and generating an internal vertical synchronization signal at a fourth time point in response to an external vertical synchronization signal received from the external device, wherein the fourth time point is when an extended VFP elapses from the first second time point, wherein the display driving integrated circuit is provided an emission control signal corresponding to target luminance of the external display panel, wherein the display driving integrated circuit controls the emission control signal such that the emission control signal has a first level during a first period and has a second level different from the first level during a second period, wherein the first period is between the second time point and the third time point and the second period is between the third time point and the fourth time point, wherein the first level is determined based on a target duty ratio corresponding to the target luminance of the external display panel, and wherein the display driving integrated circuit communicates with the external device in a video mode supported by a mobile industry processor interface (MIPI) D-Phy physical layer.

2. The operation method of claim 1, wherein the VFP is a given time.

3. The operation method of claim 1, further comprising:

outputting the second frame data to the external display panel in response to the internal vertical synchronization signal generated at the fourth time point.

4. The operation method of claim 3, wherein the second frame data is output to the external display panel after a vertical back porch (VBP) elapses from the fourth time point, in response to the internal vertical synchronization signal generated at the fourth time point.

5. The operation method of claim 1, further comprising:

before the first frame data is output to the external display panel;

outputting 0-th frame data to the external display panel;

starting to receive the first frame data from the external device at a time period between a fifth time point and a sixth time point; and generating the internal vertical synchronization signal at the sixth time point, in response to the external vertical synchronization signal, wherein the fifth time point is when the 0-th frame data is completely output, and wherein the sixth time point is when the VFP elapses from the fifth time point.

6. The operation method of claim 5, wherein the first frame data is output to the external display panel after a vertical back porch (VBP) elapses from the sixth time point, in response to the internal vertical synchronization signal generated at the sixth time point.

7. The operation method of claim 1, wherein the extended VFP is longer than the VFP.

8. The operation method of claim 1, wherein a first duty ratio of the emission control signal corresponds to a level corresponding to the target luminance of the external display panel.

9. The operation method of claim 8, wherein a second duty ratio of the emission control signal during the extended VFP is identical to the first duty ratio of the emission control signal.

10. The operation method of claim 1, wherein the target luminance of the external display panel is uniformly maintained during the first frame data and the second frame data are displayed by the external display panel.

11. An operation method of a display driving integrated circuit which performs an adaptive frame operation that adapts for frame delays in a given frame rate, the operation method comprising:

sequentially receiving a plurality of frame data from an external device in the given frame rate, and sequentially outputting the plurality of frame data to an external display panel in the given frame rate;

receiving first frame data from the external device, the first frame data being delayed with respect the given frame rate;

generating an internal vertical synchronization signal in response to an external vertical synchronization signal received from the external device; and outputting the first frame data to the external display panel in response to the internal vertical synchronization signal, wherein the display driving integrated circuit is provided an emission control signal corresponding to target luminance of the external display panel, wherein the display driving integrated circuit controls the emission control signal such that the emission control signal has a first level between a second time point and a third time point and has a second level different from the first level between the third time point and a fourth time point wherein a first time point is when previous frame data are completely output, the second time point is when a vertical front porch (VFP) beginning at the first time point passes, the third time point is a time point when starting to receive the first frame data, and the fourth time point is when the internal vertical synchronization signal is generated, wherein the first level is determined based on a target duty ratio corresponding to the target luminance of the external display panel, and wherein the display driving integrated circuit communicates with the external device in a video mode supported by a mobile industry processor interface (MIPI) D-Phy physical layer.

12. The operation method of claim 11, wherein the VFP is a given time.

13. The operation method of claim 11, wherein a duty ratio of the emission control signal between the second time point and the fourth time point corresponds to a target luminance of the external display panel.

14. A display driving integrated circuit comprising:

an interface circuit configured to receive first frame data from an external device, the first frame data being delayed with respect to a given frame rate;

a timing controller configured to generate an internal vertical synchronization signal in response to an external vertical synchronization signal received from the external device;

a source driver configured to output the first frame data to an external display panel in response to the internal vertical synchronization signal; and an emission control driver configured to output an emission control signal corresponding to target luminance, wherein the emission control driver is further configured to control the emission control signal such that the emission control signal has a first level between a second time point and a third time point and has a second level different from the first level between the third time point and a fourth time point, wherein a first time point is when previous frame data are completely output, the second time point is when a vertical front porch (VFP) beginning at the first time point passes, the third time point is a time point when starting to receive the first frame data, and the fourth time point is when the internal vertical synchronization signal is generated, wherein the first level is determined based on a target duty ratio corresponding to the target luminance of the external display panel, and wherein the display driving integrated circuit communicates with the external device in a video mode supported by a mobile industry processor interface (MIPI) D-Phy physical layer.

* * * * *